(12) United States Patent
Nasu et al.

(10) Patent No.: US 11,919,534 B2
(45) Date of Patent: Mar. 5, 2024

(54) DRIVER STATE GUIDE DEVICE AND DRIVER STATE GUIDE METHOD

(71) Applicant: DENSO CORPORATION, Kariya (JP)

(72) Inventors: Shunsaku Nasu, Kariya (JP); Takuya Takeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 30 days.

(21) Appl. No.: 17/814,622

(22) Filed: Jul. 25, 2022

(65) Prior Publication Data
US 2023/0039671 A1 Feb. 9, 2023

(30) Foreign Application Priority Data

Aug. 3, 2021 (JP) ................................. 2021-127699
May 10, 2022 (JP) ................................. 2022-077737

(51) Int. Cl.
*B60W 50/14* (2020.01)
*B60W 40/04* (2006.01)
*B60W 40/08* (2012.01)
*B60W 50/00* (2006.01)

(52) U.S. Cl.
CPC ............ *B60W 50/14* (2013.01); *B60W 40/04* (2013.01); *B60W 40/08* (2013.01); *B60W 50/0097* (2013.01); *B60W 2040/0827* (2013.01); *B60W 2050/143* (2013.01); *B60W 2050/146* (2013.01); *B60W 2540/22* (2013.01); *B60W 2540/229* (2020.02); *B60W 2554/406* (2020.02); *B60W 2556/10* (2020.02)

(58) Field of Classification Search
CPC ...... B60W 50/14; B60W 40/04; B60W 40/08; B60W 50/0097; B60W 2040/0827; B60W 2050/143; B60W 2050/146; B60W 2540/22; B60W 2540/229; B60W 2554/406; B60W 2556/10
See application file for complete search history.

(56) References Cited

U.S. PATENT DOCUMENTS

| 9,487,139 | B1* | 11/2016 | Ishida | ................. B60W 50/16 |
|---|---|---|---|---|
| 2019/0311404 | A1* | 10/2019 | Wasserman | ............ G08G 1/012 |
| 2021/0182605 | A1* | 6/2021 | Anthony | .............. G08G 1/0129 |
| 2021/0188301 | A1* | 6/2021 | Oba | ...................... B60W 50/14 |
| 2021/0387634 | A1* | 12/2021 | Luna Arriaga | . B60W 30/18163 |
| 2022/0126864 | A1* | 4/2022 | Moustafa | ......... G08G 1/096758 |

FOREIGN PATENT DOCUMENTS

JP 2006-247255 A 9/2006

* cited by examiner

*Primary Examiner* — Mohamed Barakat
(74) *Attorney, Agent, or Firm* — MASCHOFF BRENNAN

(57) ABSTRACT

A driver state guide device includes: a state identification unit identifying a present state of a driver of an own vehicle; a target estimation unit estimating a target state to which the state of the driver is guided; a route prediction unit providing a predicted route of the own vehicle; a situation prediction unit predicting a situation in the predicted route predicted by the route prediction unit; a planning unit planning, as a stimulus plan, a stimulus to be used in the predicted route to guide the state of the driver to the target state; and a stimulus control unit providing the stimulus for the driver according to the stimulus plan determined by the planning unit in the predicted route.

21 Claims, 15 Drawing Sheets

FIG. 6

| PSYCHOLOGICAL STATE | ICON |
|---|---|
| NEUTRAL | |
| HAPPY | |
| EXCITED | |
| RELAXED | |
| SAD | |
| IRRITATED | |

FIG. 15
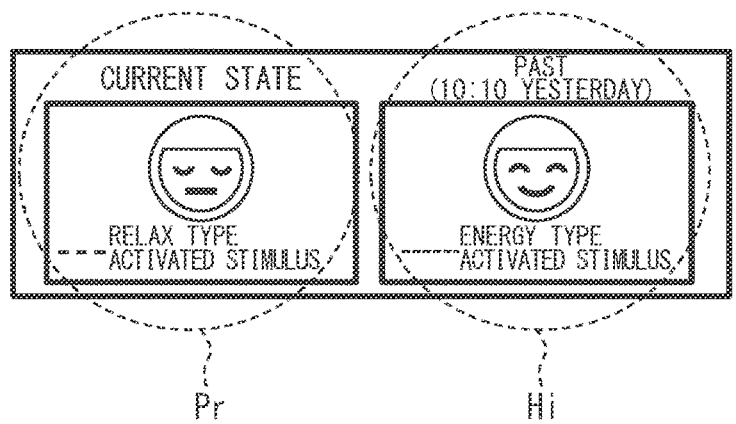
FIG. 16
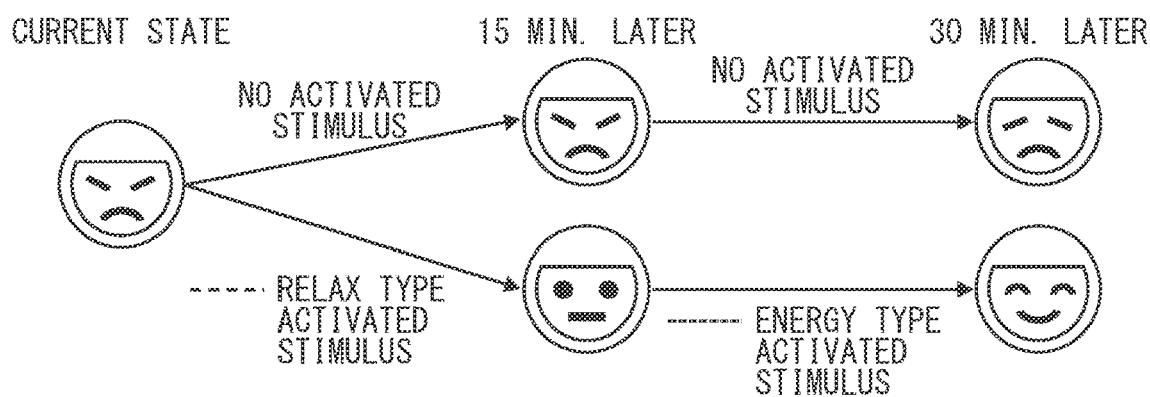
FIG. 17   ★☆☆☆☆ (1/5 POINTS)
FIG. 18
| PLEASE SELECT... | ∨ |
|---|---|
| ········ SOOTHING IRRITATION OF TRAFFIC CONGESTION | 0 |
| ------- RELAX TYPE ACTIVATED STIMULUS | |
| ---------- ENERGY TYPE ACTIVATED STIMULUS | |
| -·-·-· PREVENT UNALERTNESS | |

DRIVER STATE GUIDE DEVICE AND DRIVER STATE GUIDE METHOD

CROSS REFERENCE TO RELATED APPLICATION

The present application is based on and claims the benefit of priority of Japanese Patent Applications No. 2021-127699, filed on Aug. 3, 2021 and No. 2022-077737, filed on May 10, 2022, the disclosure of which are incorporated herein by reference.

TECHNICAL FIELD

The present disclosure generally relates to a driver state guide device and a driver state guide method.

BACKGROUND INFORMATION

A comparative document discloses a technique for presenting/providing a plurality of types of stimuli according to a mental and physical load level calculated from a driver's activity history. The patent document 1 describes increasing a duration of stimulus, which starts immediately after a start of operation of vehicle equipment, such as just after a timing of when a driving operation is started by a driver or the like situation, in accordance with an increase in the mental and physical load level.

It is an object of the present disclosure to provide a driver state guide device and a method for guiding a driver state, which is capable of providing an appropriate type of stimulus according to a change in a situation en route of the vehicle as a stimulus for guiding/leading a driver state to a preferable state.

BRIEF DESCRIPTION OF THE DRAWINGS

Objects, features, and advantages of the present disclosure will become more apparent from the following detailed description made with reference to the accompanying drawings, in which:

FIG. 6 is a diagram of an example of an icon representing a psychological state;

FIG. 15 is a diagram of an example of how to display information on a current state of a driver and a currently activated stimulus type and information on a past state of a driver and a past activated stimulus;

FIG. 16 is a diagram of an example of how to display prediction result by a current state prediction unit;

FIG. 17 is a diagram of stimulus evaluation regarding rating of a stimulus; and

FIG. 18 is a diagram of stimulus evaluation regarding preferred stimulus.

DETAILED DESCRIPTION

Figure 1:
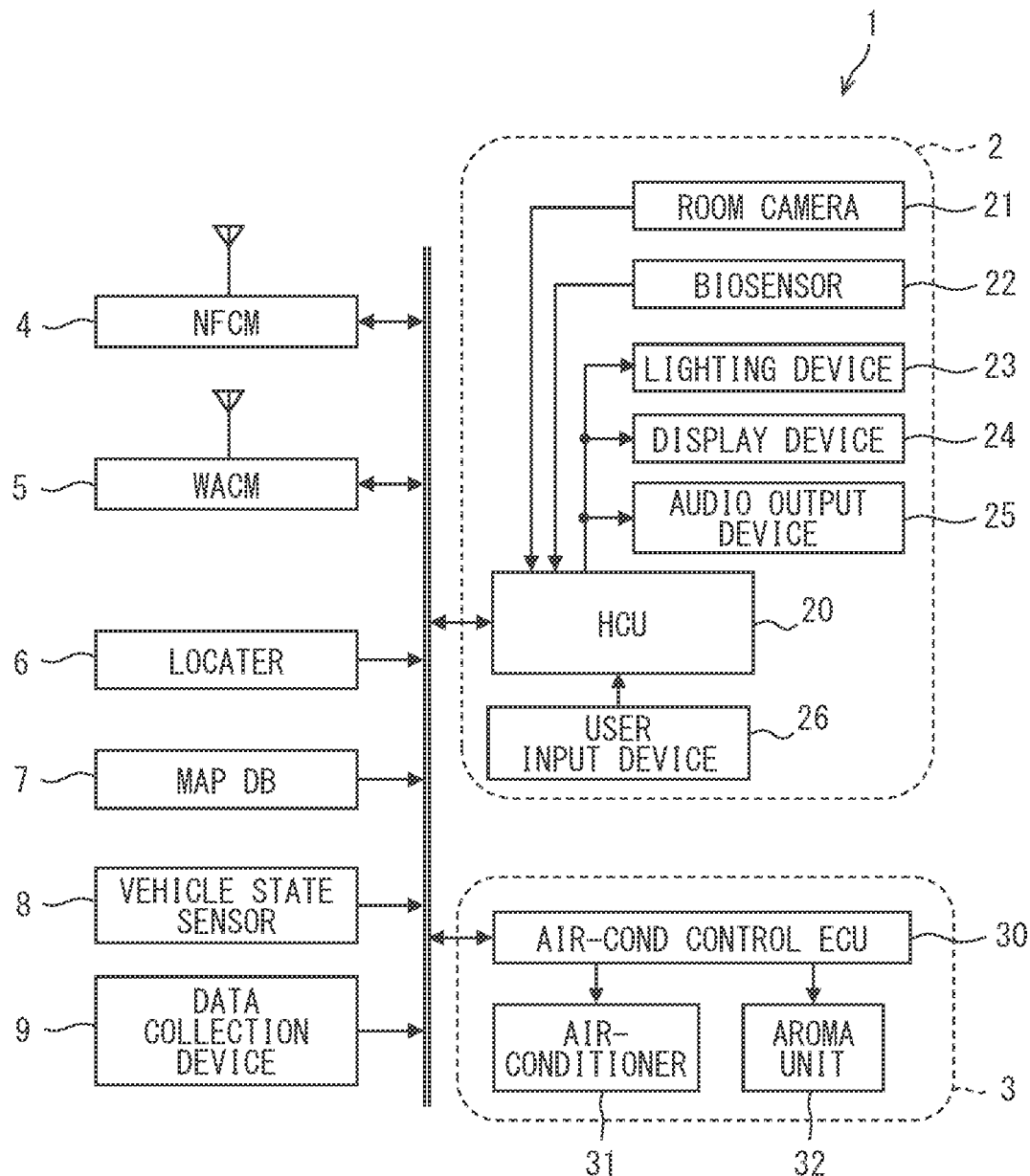
FIG. 1 is a diagram of a schematic configuration of a vehicle system 1.

Several embodiments for disclosure will be described with reference to the drawings. For the convenience of description, the parts having the same functions as the parts shown in the drawings used in the description up to that point in multiple embodiments may be designated by the same reference numerals and the description thereof may be omitted. The descriptions of other embodiments may be referable with respect to the parts given the same reference signs.

First Embodiment

<Configuration of Vehicle System 1>

The following will describe the first embodiment of the present disclosure with reference to the accompanying drawings. A vehicle system 1 shown in FIG. 1 is used in an automobile (hereinafter, simply a vehicle), and includes an HMI (Human Machine Interface) system 2, an air conditioning system 3, a short-range communication module (hereinafter, NFCM) 4, a wide area communication module (hereinafter WACM) 5, a locator 6, a map database (hereinafter DB) 7, a vehicle state sensor 8, and a data collection device 9. It is assumed that the HMI system 2, the air conditioning system 3, the NFCM 4, the WACM 5, the locator 6, the map DB 7, the vehicle state sensor 8, and the data collection device 9 are connected to, for example, an in-vehicle LAN. A vehicle equipped with the vehicle system 1 is hereinafter referred to as an own vehicle.

The air conditioning system 3 is a heating/cooling system for a vehicle. The air conditioning system 3 acquires, from the HCU 20, air-conditioning request information including air-conditioning-related setting values set by an occupant of the own vehicle, which will be described later. Then, temperature, air flow, scent, etc. in a passenger compartment of the own vehicle are adjusted according to the acquired air-conditioning request information. The air conditioning system 3 includes an air conditioning control ECU 30, an air conditioning unit 31, and an aroma unit 32.

The air conditioning unit 31 generates hot air and cold air (hereinafter referred to as air-conditioned air). The air-conditioned air is supplied to the passenger compartment from an outlet provided in, for example, an instrument panel of the own vehicle. The aroma unit 32 has beads or the like (hereinafter, impregnated substance) impregnated with an aroma oil such as an essential oil containing an aromatic component. Then, an airflow generated by the air conditioning unit 31 is passed around the impregnated substance to supply fragrance/odor to a vehicle interior. In addition, the aroma unit 32 may atomize the aroma oil. In such case, the aroma component atomized by the aroma unit 32 may be mixed with the airflow generated by the air conditioning unit 31 and may be supplied to the vehicle interior. The air conditioning unit 31 gives the occupant of the own vehicle a stimulus by or as a wind. Further, the air conditioning unit 31 gives a heating/cooling stimulus for the occupant of the own vehicle due to (i.e., which may be sensed as) the difference in temperature of the air-conditioned air. That is, the air conditioning unit 31 gives a tactile stimulus.

The aroma unit 32 gives the occupant of the own vehicle a stimulus by fragrance. That is, the aroma unit 32 gives an olfactory stimulus. Both of the air conditioning unit 31 and the aroma unit 32 are presentation devices that present stimulus. The air conditioning control ECU 30 is an electronic control device that controls the operation of the air conditioning unit 31 and the aroma unit 32. The air conditioning control ECU 30 is connected to the air conditioning unit 31 and the aroma unit 32.

The NFCM 4 is a communication module for performing short-range wireless communication. When a communication connection is established with a mobile terminal of the occupant of the own vehicle, the NFCM 4 performs short-range wireless communication with the mobile terminal. Short-range wireless communication is, for example, wireless communication in which a communication range is limited to several tens of meters at the maximum. As the short-range wireless communication, for example, wireless communication compliant with Bluetooth (registered trademark) Low Energy may be used. Examples of the mobile terminal include a multifunctional mobile phone and a wearable device. WACM 5 transmits and receives information to and from a center outside the own vehicle via wireless communication. That is, wide area communication is performed by the WACM 5.

The locator 6 includes a GNSS (Global Navigation Satellite System) receiver and an inertia sensor. The GNSS receiver receives positioning signals from multiple artificial satellites. The inertia sensor includes a gyro sensor and an acceleration sensor, for example. The locator 6 sequentially positions the current vehicle position of the own vehicle by combining a positioning signal received by the GNSS receiver and a measurement result of the inertia sensor. The vehicle position may be represented by, for example, coordinates of latitude and longitude. The vehicle position may be measured using a travel distance obtained from signals sequentially output from a vehicle speed sensor mounted on the own vehicle.

The map DB 7 is a non-volatile memory, and stores map data. The map data includes, for example, link data, node data, road attributes, and the like. The link data consists of data, regarding a unique number that identify a link, a link length that indicates the length of the link, a link direction, a link travel time, link shape information, node coordinates of start and end of the link, and road attributes. Road attributes include a road name, a road type, a road width, number of lanes, a speed regulation value, and the like. On the other hand, the node data consists of data, regarding a node ID with a unique number for each node on the map, node coordinates, a node name, a node type, a connection link ID in which a link ID of a link connected to a node is described, an intersection type, and the like. The map data may be acquired from the outside of the own vehicle using WACM 5.

The vehicle state sensor 8 is a group of sensors for detecting a state of the own vehicle such as a travel state, an operating state etc. of the own vehicle. The vehicle state sensor 8 includes a vehicle speed sensor, a steering angle sensor, an acceleration/deceleration sensor, an accelerator position sensor, a brake switch, a turn signal switch, and the like. The vehicle speed sensor is configured to detect a speed of the own vehicle. The steering angle sensor detects a steering angle of a steering wheel of the own vehicle. The acceleration/deceleration sensor detects an acceleration/deceleration of the own vehicle. The accelerator position sensor detects an opening degree of an accelerator pedal of the own vehicle. The brake switch outputs a signal according to whether or not a brake pedal of the own vehicle is depressed. The turn signal switch detects the lamp lighting operation of the turn signal of the own vehicle. The vehicle state sensor 8 outputs detection results to the in-vehicle LAN. Note that the detection results of the vehicle state sensor 8 may be output to the in-vehicle LAN via an ECU mounted on the own vehicle.

The data collection device 9 collects information on a travel history of the own vehicle (hereinafter, travel history-related information). Examples of the travel history information include travel route information, congestion degree information, and driving load information. The travel route information may be time-series data of the vehicle position sequentially positioned by the locator 6 while the own vehicle is traveling. That is, it may be a data group in which the vehicle position and the time when the vehicle position is obtained are linked/associated. Therefore, the travel route information also includes travel time information. It may be preferable to link "day of the week" information, on which day of a week the relevant data is collected, to the travel route information.

As for the information on the degree of congestion, the data collection device 9 may be configured to sequentially identify and collect a degree of congestion based on, for example, the vehicle speed of the own vehicle while the own vehicle is traveling. As the vehicle speed of the own vehicle, the detection result of the vehicle speed sensor in the vehicle state sensor 8 may be used. For example, it may be considered as a traffic congestion when (i) the vehicle speed of the own vehicle is equal to or less than a threshold value for classifying a low speed and (ii) the vehicle is traveling for a certain period of time or longer. The degree of congestion may be two stage determination, i.e., whether or not a congestion is observed. Further, the degree of congestion may be classified into three or more stages according to a duration of the congestion. Information on the degree of congestion may be associated with the vehicle position, time, day of the week, etc. from which the degree of congestion is obtained.

Regarding the driving load information, the data collection device 9 may sequentially identify driving load and may collect the identified driving load, based on a frequency of driving operations such as accelerator operation, braking operation, steering operation, and turn signal lamp lighting operation of the own vehicle while the own vehicle is traveling. The driving load shall be higher as the driver's driving task is busy. Driving tasks are, for example, steering, acceleration/deceleration, and field monitoring. The driving load may be specified higher as the frequency of driving operations increases. The driving load may be classified in two stages depending on whether the load is high or not. The frequency of driving operations may be identified based on the degree of change in the detection results of the steering angle sensor, acceleration sensor, accelerator position sensor, brake pedal force sensor, and the like. The driving load may be determined as increased when the frequency of changes in a driver's face orientation detected by a room camera 21 described later increases. This is because the driving load is considered as high when the face orientation changes drastically for field monitoring. When an inter-vehicle distance between the own vehicle and a vehicle in front of the own vehicle is identifiable by a field monitoring sensor, the driving load may be identified as a high value, when the inter-vehicle distance sequentially identified becomes shorter. The driving load information may also be linked to the vehicle position, time, day of the week, etc. from which the driving load of the vehicle is obtained.

The travel history-related information collected by the data collection device 9 may be associated with identification information for identifying each driver. The travel history-related information collected by the data collection device 9 may be uploaded to a center via WACM 5. In such manner, as driver's personal history data, the time, the information on the travel route associated with the day of the week, the information on the degree of congestion, and the information on the driving load are accumulated in the center.

The HMI system 2 acquires information on the driver of the own vehicle. The HMI system 2 accepts input from the driver of the own vehicle. The HMI system 2 presents a stimulus for the driver of the own vehicle. The stimulus here also includes provision of information. Details of the HMI system 2 will be described below.

<Configuration of HMI System 2>

The HMI system 2 includes an HCU (Human Machine Interface Control Unit) 20, a room camera 21, a biosensor 22, a lighting device 23, a display device 24, an audio output device 25, and a user input device 26. HCU is a device or a unit that visually, audibly or otherwise stimulates human sensation to control contents of information provided/presented thereto.

The room camera 21 captures a predetermined range in the vehicle interior of the own vehicle. The room camera 21 captures an image including at least a driver's seat of the own vehicle. The room camera 21 is composed of, for example, a near-infrared light source, a near-infrared camera, a control unit for controlling them, and the like. The room camera 21 captures, by the near-infrared camera, a driver irradiated with a near-infrared light by the near-infrared light source. The control unit performs an image analyzing process to the image captured by the near-infrared camera. The control unit analyzes the captured image, and detects a feature amount of the driver's face. The control unit may detect the driver's face orientation, a degree of arousal, and the like based on the detected features of the driver's face. The degree of arousal may be detected, for example, by a degree of opening and closing of the eyelids.

The biosensor 22 measures driver's biometric information. The biosensor 22 sequentially outputs the measured biometric information to the HCU 20. The biosensor 22 may be provided in the own vehicle. The biosensor 22 may be configured to be provided in a wearable device worn by the driver. When the biosensor 22 is provided in the own vehicle, it may be provided in, for example, a steering wheel, a seat, or the like. When the biosensor 22 is provided in the wearable device, the HCU 20 may be configured to acquire the measurement result of the biosensor 22 via, for example, the NFCM 4. Examples of biometric information measured by the biosensor 22 include respiration, pulse, heartbeat, and the like. Note that the biosensor 22 may be configured to measure biometric information other than respiration, pulse, and heartbeat. For example, the biosensor 22 may measure brain waves, heart rate fluctuations, sweating, body temperature, blood pressure, skin conductance, and the like.

The lighting device 23 is provided at a position visible from the driver and gives the driver a stimulus by light emission. That is, the lighting device 23 gives a visual stimulus. The lighting device 23 is a presentation device that presents a stimulus. As the lighting device 23, a light emitting device such as an LED may be used. It may be preferable that the lighting device 23 can switch the color of light emission. In the lighting device 23, the timing of turning on and off and the color of light emission are controlled by the HCU 20.

The display device 24 displays information. The display device 24 is provided at a position visible from the driver and gives the driver a stimulus by display. That is, the display device 24 provides a visual stimulus. The display device 24 is a presentation device that presents a stimulus. The display device 24 displays at least an image. The display device 24 may display text or the like in addition to the image. The display of the display device 24 is controlled by the HCU 20.

As the display device 24, for example, a meter MID (Multi Information Display), a CID (Center Information Display), a display of a navigation device, and a HUD (Head-Up Display) can be used. The meter MID is a display device provided in front of the driver's seat in the vehicle interior. As an example, the meter MID may be configured to be provided on a meter panel. The CID is a display device arranged at the center of the instrument panel of the own vehicle. The HUD is provided in, for example, an instrument panel in the vehicle interior. The HUD projects a display image formed by a projector onto a projection area defined as a projection member by a front windshield. The light of the image reflected to the vehicle interior side (i.e., toward the driver) by the front windshield is perceived by the driver sitting in the driver's seat. As a result, the driver can visually recognize a virtual image of the display image formed in front of the front windshield by superimposing it on a part of the foreground (i.e., superimposing on a field image). Instead of the front windshield, the HUD may be configured to project a display image onto a combiner provided in front of the driver's seat.

The audio output device 25 gives the driver a stimulus by sound. That is, the audio output device 25 gives an auditory stimulus. The audio output device 25 is a presentation device that presents a stimulus. Examples of the sound output from the audio output device 25 include music, environmental sound, and the like. The music may include BGM. The environmental sound may be a sound that reproduces a specific environment. As the audio output device 25, for example, an audio speaker or the like that outputs audio/voice may be used.

The user input device 26 receives an input from the driver. The user input device 26 may be an operation device that receives an operation input from the driver. The operation device may be a mechanical switch or a touch panel integrated with the display device 24. The user input device 26 is not limited to the operation device that accepts the operation input as long as it is a device that accepts the input from the user. For example, it may be a voice input device that accepts a voice command input from a user.

The HCU 20 is mainly composed of a microcomputer including a processor, a memory, an I/O, and a bus connecting them. The HCU 20 performs, by executing a control program stored in the memory, various processes such as a process related to a guidance of a driver state (hereinafter referred to as a driver state guidance-related process). The HCU 20 corresponds to the driver state guide device. The memory mentioned in the above is a non-transitory, tangible storage medium that stores non-transitorily computer-readable programs and data. Further, the non-transitory tangible storage medium is realized by a semiconductor memory, a magnetic disk, or the like. The details of the driver state guide-related process in the HCU 20 will be described below.

<Configuration of HCU 20>

Subsequently, the schematic configuration of the HCU 20 will be described with reference to FIG. 2.

Figure 2:
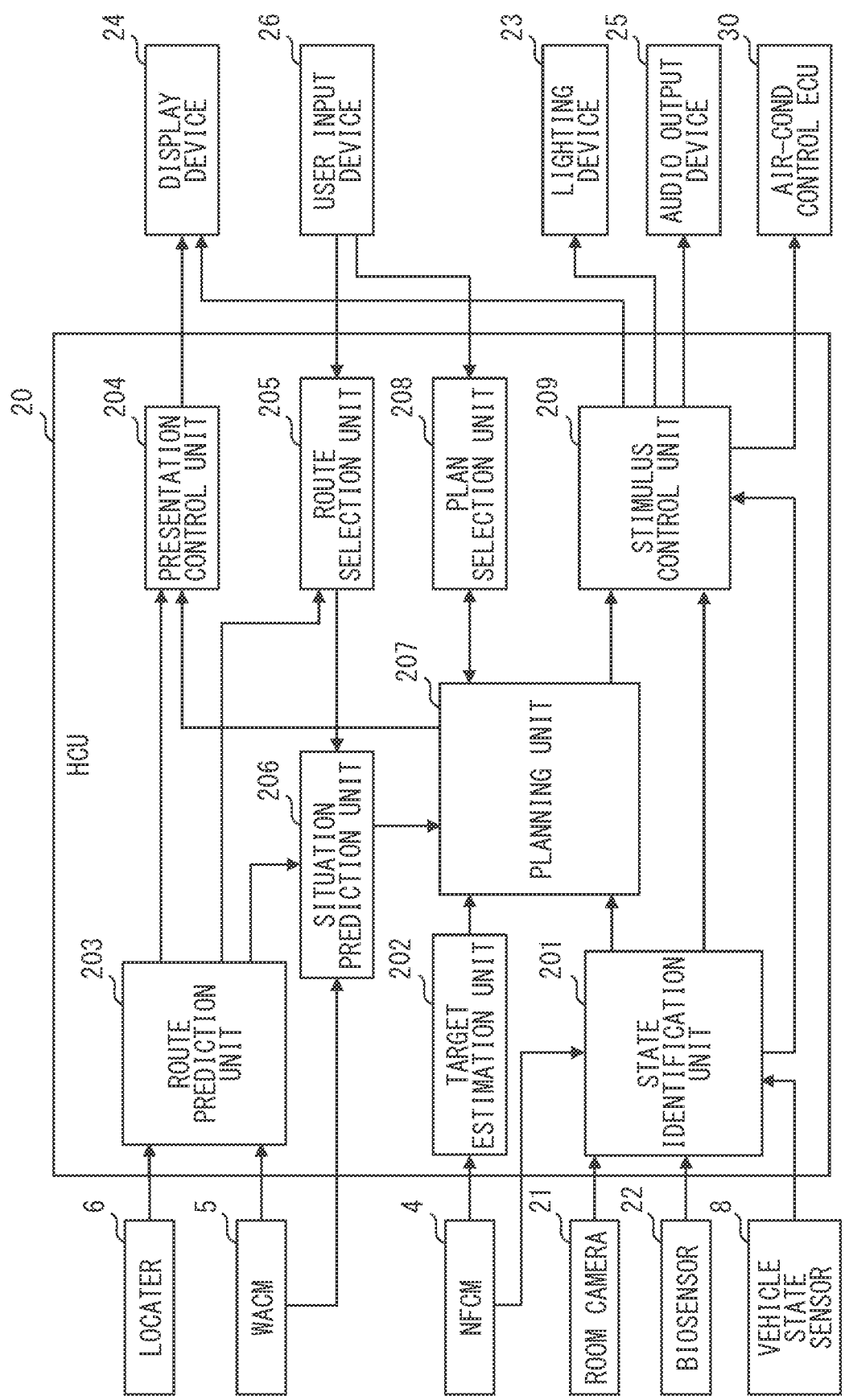
FIG. 2 is a diagram of a schematic configuration of an HCU (Human Machine Interface Control Unit)

As shown in FIG. 2, the HCU 20 has a state identification unit 201, a target estimation unit 202, a route prediction unit 203, a presentation control unit 204, a route selection unit 205, a situation prediction unit 206, a planning unit 207, a plan selection unit 208, and a stimulus control unit 209 are provided as functional blocks. Further, the execution of the process of these functional blocks by a computer corresponds to performing the driver state guide method. Note that, a part or all of the functions performed by the HCU 20 may be configured (i.e., implemented) by one or a plurality of ICs or the like, that is, may be provided as hardware logic. Further, a part or all of the functional blocks of the HCU 20 may be implemented by a combination of software executed by a processor and hardware.

Figure 3:
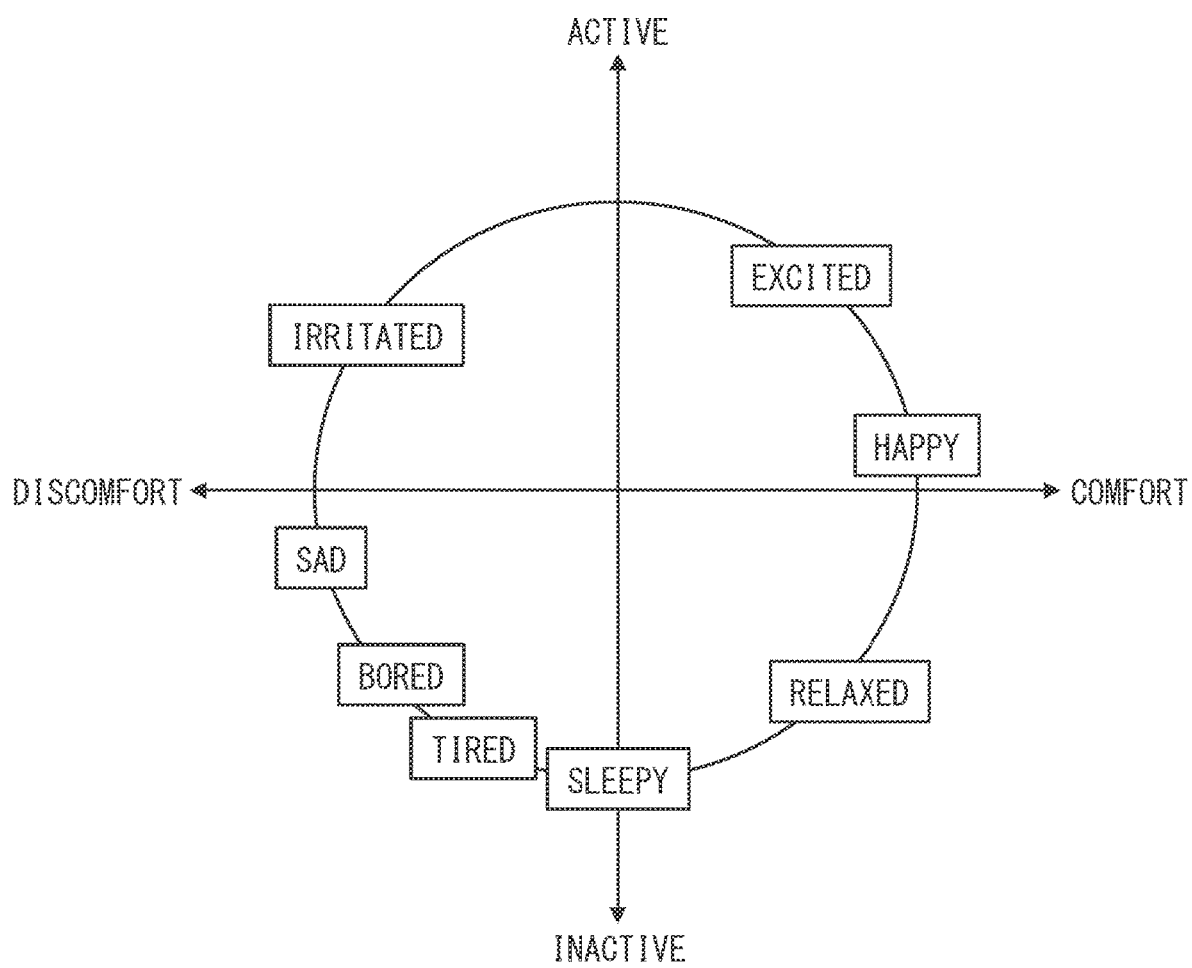
FIG. 3 is a diagram of an emotional ring (circumplex) model representing psychological states.

The state identification unit 201 identifies a state of the driver of the own vehicle. The process in the state identification unit 201 corresponds to a state identifying step. As shown in FIG. 3, the states described in the present embodiment are classified by a ring model representing psychological states on two axes, i.e., on a comfort-discomfort axis and an active-inactive axis. In other words, the states in the present embodiment are assumed as psychological states. The ring model is a so-called Russell's circumplex model. The active-inactive axis may be paraphrased as an axis of arousal and sedation. Note that, in Russell's emotional ring (circumplex) model, tired and sleepy are also considered as psychological states. In the following, as the psychological states classified by the ring model, "irritated," "sad," "bored," "tired," "sleepy," "excited," "happy," and "relaxed" shown in FIG. 3 are given as examples.

"Irritated" is a psychological state with both of high discomfort and highly active. In the present embodiment, "irritated" is, for example, assumed to be included in a stressed state. "Bored," "tired," and "sleepy" are psychological states with high discomfort but least active. Among "bored," "tired," and "sleepy," the activity decreases in an order of "bored">"tired">"sleepy." In the present embodiment, example, "bored" is, for example, included in an absent-minded state. It should be noted that "tired" may also be included in the absent-minded state. In the present embodiment, "tired" is also included in the absent-minded state. "Excited" is a psychological state which involves both of high comfort and highly active. "Happy" is a psychological state which involves high comfort and active-inactive axis is note high nor low. "Relaxed" is a psychological state which involves high comfort but active-inactive axis is low. "Irritated," "bored," "tired," and "sleepy" are psychological states of discomfort. "Excited," "happy," and "relaxed" are psychological states of comfort.

In the present embodiment, "irritated," "sad" "excited," "happy," and "relaxed" are given as examples of psychological states, but the explanation is not necessarily limited to those states. For example, it may be configured to deal with other psychological states such as "frightened," "disgusted," "surprised" and the like. "Frightened" is a psychological state which involves both of high discomfort and highly active, and more active than "irritated." "Disgusted" is a psychological state which involves both of high discomfort and highly active, and a degree of discomfort is higher than "irritated." In the example of the present embodiment, "irritated," "bored," "tired," and "sleepy" correspond to specific states. "Frightened" and "disgusted" correspond to discomfort states other than specific states. "Irritated," "bored," "tired," and "sleepy" are also discomfort states. "Excited," "happy," and "relaxed" correspond to comfort states.

The state identification unit 201 may identify the driver state from the detection result of the room camera 21. For example, a "sleepy" state may be identified from the degree of arousal. In addition, the driver state may be identified according to whether facial features corresponding to the driver state are recognized. The state identification unit 201 may also identify the driver state from the driver's biometric information measured by the biosensor 22. For example, the driver state may be identified according to whether or not the feature amount of the biometric information corresponding to the driver state is recognized.

The state identification unit 201 may also identify the driver state from the detection result of the vehicle state sensor 8. For example, the driver state may be identified according to whether or not a characteristic driving behavior corresponding to the driver state is recognized. When the driver's biometric information can be measured in advance by the driver's portable terminal, the state identification unit 201 may identify the driver state from the biometric information acquired from the portable terminal via the NFCM 4. Note that if the state identification unit 201 can estimate the driver state from the biometric information by using the portable terminal, the state identification unit 201 may identify the driver state by acquiring the estimation result via the NFCM 4.

The target estimation unit 202 estimates a state aimed at by the driver (hereinafter referred to as a target state). The process in the target estimation unit 202 corresponds to the target estimating step. The target estimation unit 202 may estimate the target state to guide the driver to a comfortable state when the driver state identified by the state identification unit 201 is an uncomfortable state. The target estimation unit 202 may estimate the target state to guide the driver to a comfortable state when the driver state identified by the state identification unit 201 is neither an uncomfortable state nor a comfortable state. When the driver state identified by the state identification unit 201 is in a comfortable state, the target estimation unit 202 may estimate the target state to maintain the comfortable state.

The target estimation unit 202 may estimate, as the target state, one of the comfortable states according to a driver's schedule, a destination, and the like. The driver's schedule may be acquired from a schedule application of the driver's portable terminal. If there is a destination input to the navigation device, such a destination may be acquired. When the route prediction unit 203, which will be described later, predicts a destination, the destination may be acquired as the one predicted by the route prediction unit 203. If a family birthday is set as a plan of an immediate future for the driver, an "excited" state may be estimated as the target state, for example. If a meeting is set as a driver schedule immediately after from now, a "relaxed" state may be estimated as the target state, for example. If the driver has no plan and the destination is home, a "happy" state may be estimated as the target state, for example. If the destination is a work place, an "excited" state may be estimated as the target state, for example.

The route prediction unit 203 predicts a route of the own vehicle. The process in the route prediction unit 203 corresponds to a route predicting step. The route prediction unit 203 may predict position coordinates group to be serving as a route and a travel time of the route. When the route prediction unit 203 has a destination input to the navigation device, the route prediction unit 203 may predict, as a route of the own vehicle, a route connecting a current vehicle position determined by the locator 6 to the destination as the route of the own vehicle. In such case, candidates for a plurality of routes may be predicted under various conditions such as time prioritized, distance prioritized, and the like. The travel time of the route may be predicted from a link travel time stored in the map DB 7.

The route prediction unit 203 may predict a destination and a route based on the driver's personal history data acquired from the center via WACM 5. In such case, the route may be predicted by identifying a highly-frequent destination and travel route in a personal history data based on the current vehicle position, the current time, and the current day of the week positioned/measured by the locator 6. In such case, a plurality of route candidates may be predicted.

The travel time of a route may be predicted from the time of each of vehicle positions associated with information of the travel route in the driver's personal history data.

It may be preferable that the route prediction unit 203 re-predicts a route of the own vehicle when the route actually traveled by the own vehicle deviates from the predicted route. Deviating from the predicted route may be, for example, when entering a link different from the link of the predicted route. Further, it may be preferable that the route prediction unit 203 predicts a plurality of candidate routes as the route of the own vehicle. In such manner, the driver is enabled to select a desired route.

The presentation control unit 204 causes the display device 24 or the audio output device 25 to present information. In the present embodiment, the following describes, for example, a situation in which information is presented from the display device 24. The presentation control unit 204 presents information of a stimulus plan for providing a stimulus for the driver which is determined by the planning unit 207 described later.

It may be preferable that the presentation control unit 204 presents information on a plurality of candidate routes predicted by the route prediction unit 203 at least as the plan-related information. As an example, information on a plurality of candidate routes may be displayed on a screen of a navigation device such as a display or a CID. As a display mode, candidate routes may be displayed on a map, or a list of candidate routes may be displayed. When the presentation control unit 204 presents information on a plurality of candidate routes, the driver performs a selection input to select one route from the plurality of candidate routes based on the presented candidate route information. The presentation control unit 204 may provide a presentation (e.g., may display a message) prompting a selection input.

The route selection unit 205 selects one route from the plurality of candidate routes predicted by the route prediction unit 203 according to the selection input received from the driver. The selection input may be made by configuring, for example, a touch panel having a touch screen accepting a touch operation on the screen while an image displayed on the display of the navigation device, the CID, and the like.

The situation prediction unit 206 predicts a situation (hereinafter referred to as an en route situation) of the predicted route predicted by the route prediction unit 203. The process in the situation prediction unit 206 corresponds to a situation predicting step. When one predicted route is selected from a plurality of candidate routes by the route selection unit 205, the situation prediction unit 206 predicts a situation of the predicted route (e.g., predicts a situation to be encountered en route on the predicted route that leads to the destination). The situation prediction unit 206 predicts, as an en route situation at least one of (i) a situation in which the driver's driving load becomes high, (ii) a degree of traffic congestion, and (iii) a monotonous driving. The situation prediction unit 206 predicts the situation for each of plural areas in the predicted route, for example. The area mentioned here may be an area divided by using categories such as links and nodes.

The situation prediction unit 206 may predict, as an en route situation, a situation in which the driver's driving load is high from a road type of a road of the predicted route. The road type of the road of the predicted route may be identified by collating map data stored in the map DB 7 with the predicted route. The situation prediction unit 206 may predict a situation in which the driver's driving load is high in an area where the road type of the road is identified as a narrow street or a road in a residential area. This is because, on a narrow street and a road in a residential area, due to time and efforts to monitor the surrounding of the own vehicle, the driving load is estimated as high load. The situation prediction unit 206 may identify a situation in which the driver's driving load is high from the driver's personal history data acquired from the center via WACM 5. The situation prediction unit 206 may predict a situation in which the driver's driving load is high in an area which is recorded, in the personal history data, that the driving load is high. By using the personal history data, it becomes possible to more accurately predict an en route situation for each of the different drivers.

The situation prediction unit 206 may predict a degree of congestion as an en route situation from congestion information acquired from the center via WACM 5. The situation prediction unit 206 may identify a degree of congestion for each of the links en route along the predicted route by collating the congestion information for each link with the predicted route. The situation prediction unit 206 may predict that the predicted route is congested in an area where the degree of congestion is equal to or higher than a predetermined value. The situation prediction unit 206 may identify a degree of congestion from the driver's personal history data acquired from the center via WACM 5. The situation prediction unit 206 may predict a congestion of the area where a degree of congestion is high in the personal history data. By using the personal history data, it becomes possible to more accurately predict an en route situation for each of the different drivers. A congestion predicted as an en route situation corresponds to a situation that worsens the driver state. This is because a congestion is estimated to guide/lead the driver to an "irritated" state.

The situation prediction unit 206 may predict the monotonousness of driving as an en route situation from the map data of the predicted route. The situation prediction unit 206 may predict the monotonousness of driving from the road type along the predicted route. The situation prediction unit 206 may predict that the driving in an area of certain road types such as a highway, a motorway and the like is monotonous. Further, the situation prediction unit 206 may predict that the driving is monotonous in an area where the road extends as a straight path for a predetermined distance or more. The situation prediction unit 206 may identify the monotonousness of driving from the personal history data of the driver acquired from the center via WACM 5. The situation prediction unit 206 may predict that the driving is monotonous for an area in the personal history data where the driving load continues to be low for a predetermined distance or more. By using the personal history data, it becomes possible to more accurately predict an en route situation for each of the different drivers. The monotonous driving that is predicted as an en route situation corresponds to a situation that worsens the driver state. This is because such a situation where driving is monotonous leads the driver to a state of "bored" and "sleepy."

When using the personal history data, the situation prediction unit 206 may create a map of the driving load and a degree of congestion sorted by location, day of the week, and time. Then, with reference to such map, the driving load and the degree of congestion along the predicted route may be identified. Since the day of the week and the time are associated with the personal history data, it is possible to identify the driving load and the degree of congestion not only by location but also by day of the week and time. Therefore, the situation prediction unit 206 can predict the situation where the driving load is high, the congestion, and the monotonous driving not only by location but also by day of the week and time.

The situation prediction unit 206 may predict, as an en route situation, a situation that changes the driver state other than the one deteriorating the driver state. For example, the situation prediction unit 206 may predict a situation in which the driver state is changed to a "relaxed" state in an area facing a coast in the predicted route.

When the route prediction unit 203 re-predicts the route of the own vehicle, the situation prediction unit 206 may predict an en route situation of the re-predicted route. When the route prediction unit 203 predicts a plurality of candidate routes, the situation prediction unit 206 predicts an en route situation of the predicted route by using the route selected from among the candidate routes by the route selection unit 205.

The planning unit 207 decides a stimulus plan to be used along the predicted route for guiding the driver to the target state, according to the situation on the predicted route predicted by the situation prediction unit 206, in addition to (i) the driver state identified by the state identification unit 201 and (ii) the target state estimated by the target estimation unit 202. The process in the planning unit 207 corresponds to the plan deciding step. The driver state identified by the state identification unit 201 is hereinafter referred to as a current state. The stimulus plan may be provided as a scheduling including, for example, a type of stimulus to be provided, a timing of stimulus provision, a time allocation of stimulus provision and the like.

In the following, the determination of the stimulus plan will be described with reference to FIG. 4.

Figure 4:
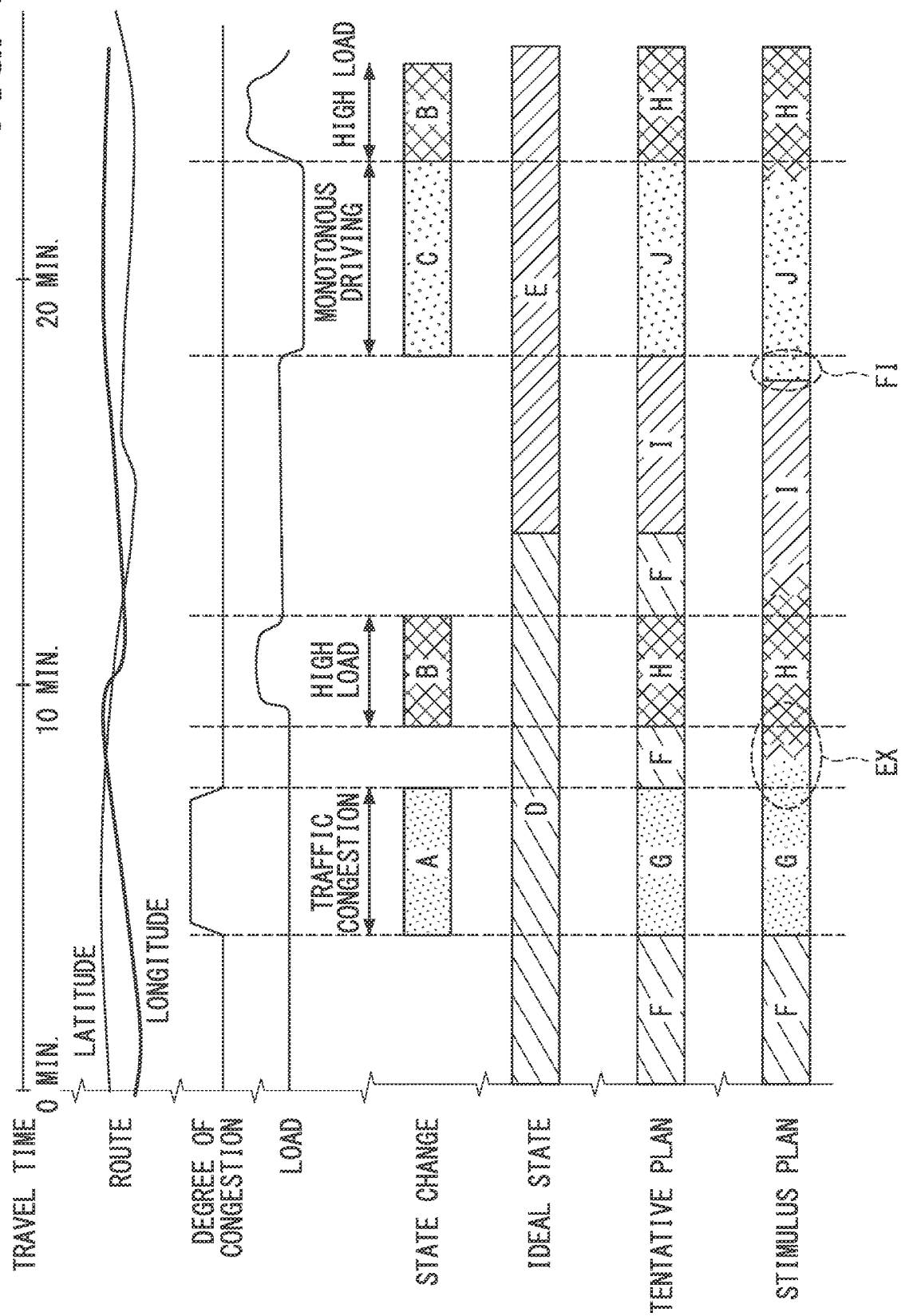
FIG. 4 is a diagram of a determination of a stimulus plan.

FIG. 4 is a diagram for explaining an example of a stimulus plan.

FIG. 4 shows an example of a case where the current state is identified as "tired" and the target state is estimated to be "excited."

In the example of FIG. 4, it is assumed that traffic congestion, high load, and monotonous operation are predicted as an en route situation, also known as an in route situation.

The planning unit 207 may determine an ideal state of the driver (hereinafter referred to as an ideal state) en route on the predicted route based on (i) the current state identified by the state identification unit 201 and (ii) the target state estimated by the target estimation unit 202. The planning unit 207 may determine the ideal state by referring to a correspondence between (i) a combination of the current state and the target state and (ii) the ideal state that are associated in advance. The ideal state may preferably be set as a state via which the current state should desirably/preferably transit to the target state and also as a state portioned therebetween, i.e., in view of the target state, which may be hereafter designated as a via state. In the example of FIG. 4, the ideal state is determined as "relaxed" in the first half portion and "excited" in the second half portion. In FIG. 4, "Relaxed" is represented by D and "Excited" is represented by E. The ratio of time allocation between the via state and the target state in the ideal state may be arbitrarily set. Further, the target state may be used as it is as the ideal state.

The planning unit 207 predicts a change in the driver state en route on the predicted route based on a situation on the predicted route predicted by the situation prediction unit 206. As an example, in an area where the en route situation is predicted as congestion, a state change to "irritated" may be predicted (A in FIG. 4). In an area where the en route situation is predicted as high load, a state change to a low receptive state may be predicted where a receptivity of the stimulus is low (hereinafter referred to as a low receptive state) (B in FIG. 4). In an area where the en route situation is predicted as monotonous driving, a state change to "bored" or "sleepy" may be predicted (C in FIG. 4).

The planning unit 207 may determine a tentative plan that provides a stimulus that is estimated to guide/lead to the determined ideal state for a section of the prediction route in which no state change is predicted. For example, as shown in F of FIG. 4, for a section in which no state change is expected and "relaxed" is determined as an ideal state, a tentative plan that provides a stimulus estimated to guide/lead user to the "relaxed" state may be determined. The following are examples of stimuli that guide/lead user to the "relaxed" state. A cycle of dimming and brightening the lighting of the lighting device 23 may be provided in a long cycle such as a cycle of 8 seconds or more. The lighting device 23 may be made to emit light in a color estimated to have a relaxing effect. The aroma unit 32 may generate an aroma estimated to have a relaxing effect via the air conditioning control ECU 30. Slow tempo music may be output from the audio output device 25.

In addition, as shown in I of FIG. 4, for a section where no state change is expected and "Excited" is determined as an ideal state, a tentative plan that provides a stimulus estimated to guide/lead user to "Excited" state is determined. The following is an example of a stimulus that guides/leads user to "Excited." Up-tempo music may be output from the audio output device 25.

The planning unit 207 may determine a tentative plan that provides a stimulus according to a state change for a section of the predicted route in which the state change is expected. The planning unit 207 determines a tentative plan that provides a stimulus that is estimated to improve a deterioration of the driver state for a section in which a state change that would worsen the driver state is expected. For example, for a section in which "irritated" due to traffic congestion is expected as shown in G of FIG. 4, a tentative plan for providing a stimulus estimated to improve "irritated" state is determined. Examples of stimuli that are estimated to improve "irritated" state include the following.

The aroma unit 32 may generate an aroma estimated to have a sedative effect via the air conditioning control ECU 30.

A cycle for dimming and brightening the lighting in the lighting device 23 may be provided in a slow cycle, such as a cycle of 6 seconds or more.

Further, as shown in J of FIG. 4, in the section in which "bored" and "sleepy" due to monotonous driving are expected, a tentative plan for providing a stimulus estimated to improve the absent-minded state and/or sleepiness is determined. The following are examples of stimuli that are estimated to improve the absent-minded state and/or sleepiness. A refreshing fragrance may be generated from the aroma unit 32 via the air conditioning control ECU 30. Cold air may be generated from the air conditioning unit 31 via the air conditioner control ECU 30. Up-tempo music may be output from the audio output device 25.

The planning unit 207 determines, preferably, a tentative plan for suppressing the stimulus in a section of the predicted route in which the situation prediction unit 206 predicts that the driver's driving load will be high. That is, as in H of FIG. 4, in the section in which a low receptive state due to a high load is expected, a tentative plan that does not provide stimulus may be determined. This is because it is useless to provide a stimulus in a low receptive state. Note that, for the section in which the driving load is expected to be high, a tentative plan for stimulus suppression may be determined from the viewpoint of reducing influence on driving operation. In such case, the suppression of the stimulus may be realized by a configuration in which an intensity of the stimulus is weakened, in addition to the configuration in which the stimulus is not provided.

It may be preferable that the planning unit 207 determines a stimulus plan from a tentative plan so that the stimulus mode is more comfortable for the driver by utilizing a fact that the situation prediction unit 206 can predict an en route situation of the predicted route.

It may be preferable that the planning unit 207 determines a stimulus plan by (i) omitting a stimulus that is scheduled to have a duration less than a threshold value and (ii) replacing it with the stimulus before or after such a stimulus. The threshold value mentioned here may be a value that makes the driver feel that the switching of stimuli is frequent. According to the above, the stimulus will not be frequently switched, thereby saving the driver from being bothered by such switching, does not change frequently, and the driver does not feel annoyed. In an example of FIG. 4, since the duration of the stimulus of F between the stimulus of G and H is short, the stimulus of F is replaced with the stimulus of G and H, respectively, and the stimulus plan is determined (See EX of FIG. 4). In case of omitting a less-than-threshold stimulus and replacing it with the one therebefore or thereafter, the before stimulus may be provided as fade-out, and the after-stimulus may be provided as fade-in, by determining a stimulus plan.

It may be preferable that, for a section of the predicted route which is predicted by the situation prediction unit 206 to have a situation that deteriorates the driver state, the planning unit 207 determines a stimulus plan that starts, proactively before entering such a section, a stimulus estimated to improve the situation/deterioration. According to the above, it becomes easier to guide the driver state in a comfortable direction, as compared with starting the improvement after the state has deteriorated. In an example of FIG. 4, the stimulus plan is determined to start a stimulus J, which is estimated to improve the deterioration, prior to the entry into a section C in which it is expected to make the driver feel "bored" and/or "sleepy" (See FI in a bottom row of FIG. 4).

In the present embodiment, a configuration is shown in which the planning unit 207 determines the stimulus plan based on the tentative plan after deciding the tentative plan, but the present disclosure is not necessarily limited to such a configuration. For example, the planning unit 207 may determine the tentative plan as a stimulus plan.

It may be preferable that the planning unit 207 determines, as a stimulus plan, a plurality of candidate plans for one predicted route. In such manner, the driver has a freedom of choosing his/her favorite stimulus plan. It may be preferable that the presentation control unit 204 presents information on a plurality of candidate plans determined by the planning unit 207 at least as the plan-related information. As an example, information on a plurality of candidate plans may be displayed on the display of the navigation device, the screen of the CID, and the like. As a display mode, a graph showing the type, timing, and time allocation of the stimulus as shown in FIG. 4 or the like may be displayed for each candidate plan. When the presentation control unit 204 presents information on a plurality of candidate plans, the driver inputs a selection input to select one stimulus plan from the plurality of candidate plans based on the presented candidate plan information. The presentation control unit 204 may provide a presentation (e.g., may display a message) prompting a selection input.

The presentation control unit 204 may display, overlappingly on top of the map, the plan related information on (i) the predicted route, (ii) stimulus types to be provided to the driver en route on the predicted route according to the plan determined by the planning unit 207 (activated stimulus type, hereinafter), and (iii) the ideal state of the driver to which the driver is guided by the provided stimulus. In such manner, the driver can readily and intuitively recognize the plan, i.e., the activated stimulus type and the ideal state en route on the predicted route.

Figure 5:
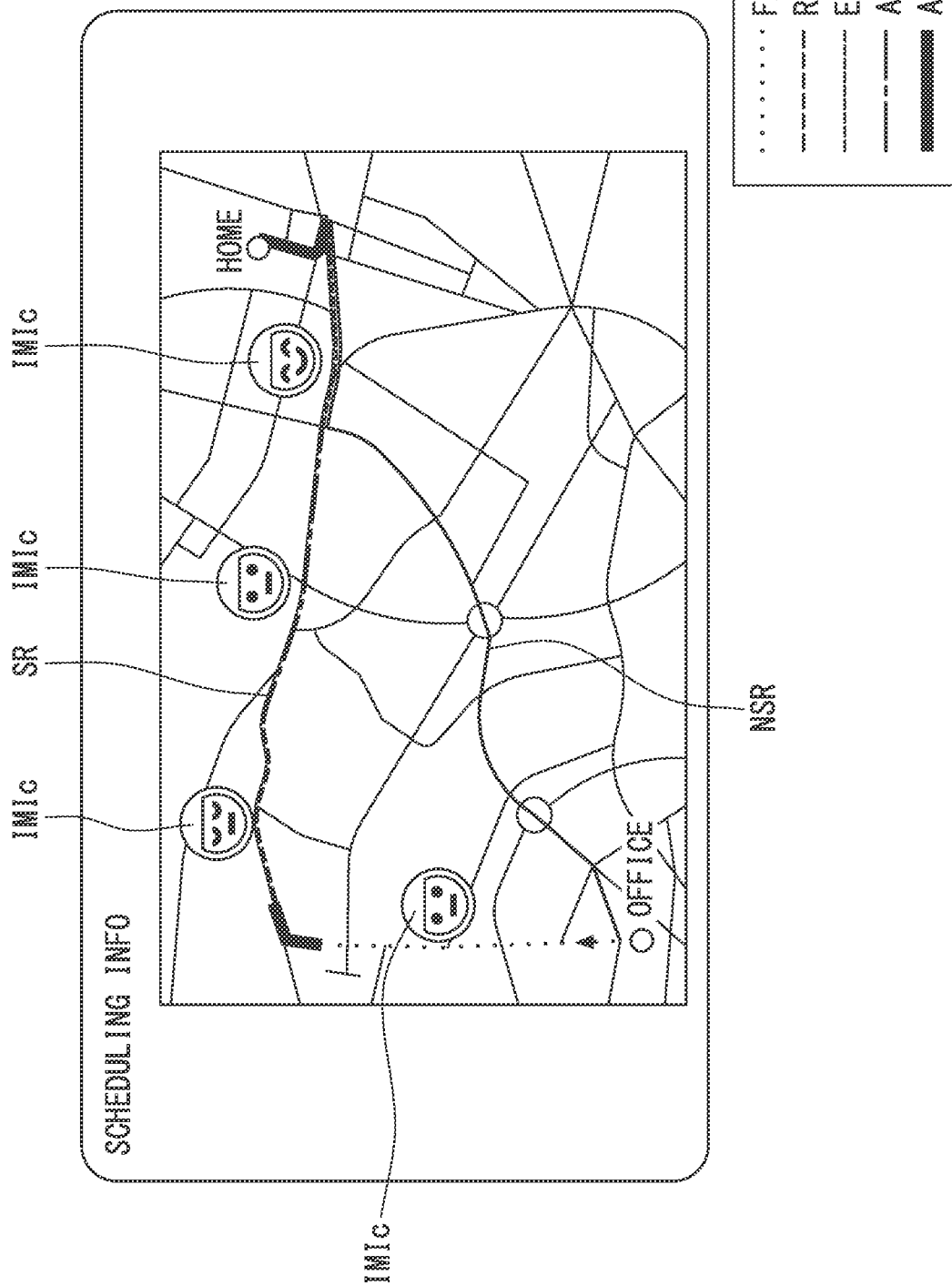
FIG. 5 is a diagram of an example of how plan related information is displayed.

Here, by using FIG. 5, an example of how to display the plan related information is described. The plan related information may also be designated as scheduling information. FIG. 5 is an example of displaying the scheduling information overlappingly on an electronic map on screen of the display device 24. An icon IMIc in FIG. 5 represents information regarding the ideal state. A line SR in FIG. 5 represents a currently-selected predicted route. A line NSR in FIG. 5 represents a currently-not-selected predicted route. Selection of the predicted route may be performed as an input to a plan selection unit 208, which is described later. Different line types representing the predicted route in FIG. 5 respectively correspond to different activated stimulus types. More specifically, a line type FA shows providing a stimulus that is estimated to improve "irritated" state. Further, a line type RA shows providing a stimulus that is estimated to guide/induce "relaxed" state, a line type EA shows providing a stimulus that is estimated to induce "excited" state, a line type AA shows providing a stimulus that is estimated to improve "absent-minded" state/sleepiness, and a line type AR shows suppressing a stimulus. Note that the same representations are used in the following drawings.

As shown in FIG. 5, activated stimulus types provided en route along the predicted route are shown for the currently-selected predicted route. Note that the activated stimulus types may also be represented by using colors. Further, the ideal states to be realized en route along the predicted route are shown by icons for the currently-selected predicted route. The ideal states may be classified into types such as "neutral" "happy" "excited" "relaxed" "sad" and "irritated." The "neutral" is a state that is not classifiable into other states other than "neutral." The respective types of ideal state are represented by icons imitating different facial expressions as shown in FIG. 6. Two different icons representing two ideal discomfort states, i.e., sad and irritated, in FIG. 6 mean that they may have/induce effects on safety of driving operation. For example, rough driving caused by high-intensity irritation may diminish, i.e., may be guided to normal/safe driving, when a sad state is incurred by stimulus. Also, high-intensity sad state causing a less-agile driving operation may be improved by guiding the driver to an irritated state. However, guiding the driver into a discomfort state may be less acceptable by the driver, thereby such an ideal state in discomfort category may be excluded from actual operation of the driver state guide device.

The plan selection unit 208 selects one candidate plan from the plurality of candidate plans according to the selection input received from the driver. Then, the planning unit 207 determines the selected candidate plan as the stimulus plan. The selection input may be made by configuring, for example, a touch panel having a touch screen accepting a touch operation on the screen while an image displayed on the display of the navigation device, the CID, and the like.

After the stimulus plan is determined by the planning unit 207, the presentation control unit 204 may present, for example, the following plan-related information. As the plan-related information, the predicted route and the travel time predicted by the route prediction unit 203 may be presented. The predicted route may include a destination. As the plan-related information, the en route situation predicted by the situation prediction unit 206 may be presented. For example, a section corresponding to traffic congestion, high load, or monotonous driving may be displayed on a map. As the plan-related information, the current state identified by the state identification unit 201 may be presented. As the plan-related information, the type of stimulus being provided or planned to be provided, the content of the stimulus, and a duration of the stimulus may be presented.

Note that the plan-related information is not limited to the configuration to be displayed on the display device 24. The plan-related information may be output by voice from the audio output device 25. In addition, the plan-related information may be transmitted to the driver's portable terminal via the NFCM 4 and displayed on the screen of the portable terminal. For example, the plan-related information may be presented when the user input device 26 or the driver's portable terminal receives an input requesting the presentation of the plan-related information.

When the route prediction unit 203 re-predicts a route of the own vehicle, the planning unit 207 may re-determine a stimulus plan according to the en route situation of the re-predicted, predicted route. When the presentation control unit 204 re-determines the stimulus plan by the planning unit 207, it may be preferable that the presentation control unit 204 presents, at least as the plan-related information, the content of the change in the stimulus plan due to the re-determination of the stimulus plan. As an example, the display device 24 may display which stimulus was changed and how, or the audio output device 25 may output voice.

In a section in which the situation prediction unit 206 predicts a situation in which the driver state should be changed from a certain state, when the state identification unit 201 identifies an actual state as the one different from that certain state, the planning unit 207 may preferably re-determines the stimulus plan for the driver, i.e., for using a stimulus suitable for the driver and for the actually-identified state identified by the state identification unit 201.

According to the above, it is possible to more accurately guide/lead the driver state to a preferable state by stimulating according to the actually identified driver state. For example, when the driver state is not "irritated" in a section predicted as having traffic congestion, the stimulus plan may be re-determined, for switching (i) from a plan that improves an irritated state (ii) to a plan that guides the user to "relaxed" state.

The stimulus control unit 209 causes the driver to be stimulated according to the stimulus plan determined by the planning unit 207 enroute along the predicted route used for determining the stimulus plan. The process of the stimulus control unit 209 corresponds to a stimulus controlling step. Enroute along the predicted route means the route on which the own vehicle is traveling as the predicted route. The stimulus control unit 209 selects the type of stimulus according to the stimulus plan, provides the stimulus, or suppresses the stimulus. When a plurality of candidate plans are determined by the planning unit 207, the stimulus control unit 209 causes the driver to be stimulated by the plan selected by the plan selection unit 208 from among the candidate plans.

The stimulus control unit 209 may preferably cause the driver to be stimulated by a stimulus that is estimated to improve a specific state regardless of a stimulus plan determined by the planning unit 207, based on the specific state identified by the state identification unit 201, enroute along the predicted route that is used to determine the stimulus plan. As described above, the specific state is an uncomfortable state such as "irritated," "bored," "tired," and "sleepy."

According to the above, by giving priority to an improvement of a specific state that is considered to have a stronger adverse effect on driving, it is possible to further suppress the adverse effect from the specific state on driving. When a specific state is identified by the state identification unit 201, it may be preferable to immediately improve the specific state by providing a stimulus estimated to be effective for improving the specific state in a short time.

When the stimulus control unit 209 causes a stimulus estimated to improve the specific state, and, after the state identified by the state identification unit 201 has improved from the specific state by such stimulus, the stimulus control unit 209 may preferably provide "non-guiding" stimulus in a prioritized manner, which is a stimulus estimated not to guide the driver state back to the specific state, regardless of the stimulus plan determined by the planning unit 207, based on the fact that (i) the non-guiding stimulus and (ii) the stimulus according to the stimulus plan determined by the planning unit 207 do not match.

According to the above, it is possible to prevent the specific state from coming back immediately after the improvement/exit from the specific state. The non-guiding stimulus may be a stimulus according to the type of the specific state. For example, when the specific state is "sleepy," the improvement of the specific state may be performed by a refreshing fragrance/aroma, while the non-guiding stimulus may be provided by the output of up-tempo music.

It should be noted that the process of providing the non-guiding stimulus in a prioritized manner may be configured to be limited to a predetermined period after the improvement from the specific state. The predetermined period mentioned here may be arbitrarily set.

In a situation in which a stimulus that does not match the one in the stimulus plan determined by the planning unit 207 enroute along the predicted route that is used to determine the stimulus plan, the stimulus control unit 209 provides, preferably, according to a predetermined priority order, a stimulus having a higher priority order from among (i) the stimulus according to the stimulus plan determined by the planning unit 207 and (ii) the stimulus that does not match such a stimulus, i.e., whichever having a higher priority. The predetermined priority order may be, for example, from the highest priority, a stimulus corresponding to sleepiness, a stimulus corresponding to an absent-minded state, a stimulus corresponding to a stressed state, a stimulus corresponding to an uncomfortable state other than the specific state, and a stimulus corresponding to a comfortable state.

According to the above, by providing a high-priority stimulus first, it becomes possible to give priority to a response having a high priority. In such manner, for example, in responding to a specific state, a stimulus corresponding to the sleepiness is provided in a prioritized manner than a stimulus corresponding to the absent-minded state.

The presentation control unit 204 may preferably present information on the display device 24 regarding (i) the driver state identified by the state identification unit 201 and (ii) the stimulus type being provided at the moment of such identification of the driver state (i.e., the currently activated stimulus type). In such manner, the driver can readily recognize the current state of him/herself and the stimulus provided thereto. Further, in addition to the information on the driver state and the currently activated stimulus type, information on (i) the stimulus type that should be currently provided to the driver according to the stimulus plan that has been determined by the planning unit 207 (i.e., planned activated stimulus) and (ii) the ideal state of the driver to be guided by such a stimulus may also preferably be displayed on the display unit 24. In such manner, the driver can readily recognize difference between the plan and the reality regarding the driver state and the activated stimulus type. The presentation control unit 204 may display, in a comparable manner on the display unit 24 (e.g., on the same screen), (a) the information on the current driver state and the currently activated stimulus type and (b) the information on the ideal state and the planned activated stimulus type. Note that "during the travel on the predicted route" includes a situation described later in which the vehicle is temporarily stopping with its power switch being turned on.

Figure 7:
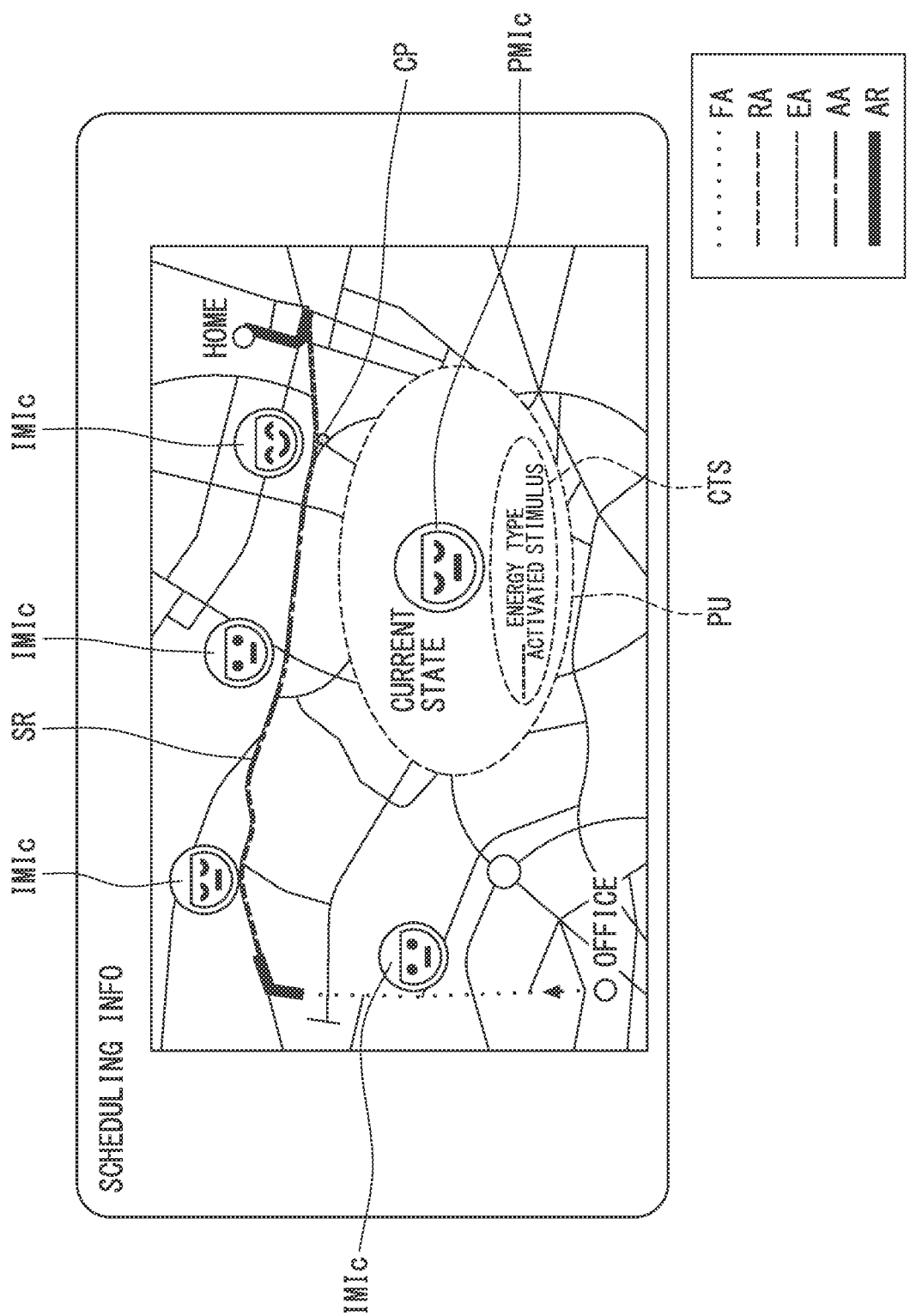
FIG. 7 is a diagram of an example of how to display information on a current state of a driver and a currently activated stimulus type and information on an ideal state and a planned activated stimulus.
Figure 8:
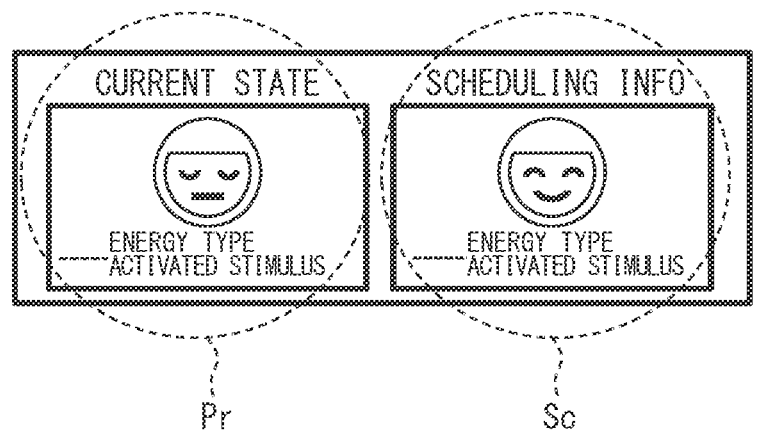
FIG. 8 is a diagram of another example of how to display information on a current state of a driver and a currently activated stimulus type and information on an ideal state and a planned activated stimulus.

With reference to FIGS. 7 and 8, an example of how to display (a) the information on the current driver state and the currently activated stimulus type and (b) the information on the ideal state and the planned activated stimulus type. First, by using FIG. 7, an example of overlappingly displaying the information on the electronic map is shown. A point CP in FIG. 7 represents a current position of the own vehicle. A graphic PU in FIG. 7 represents the information on the current driver state and the currently activated stimulus type. An icon PMIc in FIG. 7 represents the information on the current driver state. A graphic CTS in FIG. 7 represents the currently activated stimulus type. The information on the current driver state and the currently activated stimulus type may be displayed as a pop-up graphic that is associated with the current position of the own vehicle as shown in FIG. 7. The current driver state may be displayed as the icon PMIc in FIG. 7. The currently activated stimulus type may be displayed as the graphic CTS in FIG. 7, including a name of the currently activated stimulus type and a graphic representing the currently activated stimulus type. The ideal state may be displayed en route along the predicted route overlappingly on the electronic map as shown in FIG. 7. The planned activated stimulus type may be represented by using different type of the lines that are shown overlapping along the predicted route. The different type of the lines may be classified in the same manner as FIG. 5.

Now, by using FIG. 8, an example of showing (a) the information on the current driver state and the currently activated stimulus type and (b) the information on the ideal state and the planned activated stimulus type without overlap on the electronic map is described. In this case, (a) the information on the current driver state and the currently activated stimulus type and (b) the information on the ideal state and the planned activated stimulus type may both be displayed in front of the driver by, for example, a head-up display (HUD). A graphic Pr represents an example of (a) the information on the current driver state and the currently activated stimulus type. A graphic Sc represents an example of (b) the information on the ideal state and the planned activated stimulus type. The current driver state and the ideal state may both be represented by icons, as shown in FIG. 8. The currently activated stimulus type may be displayed as the graphic Pr in FIG. 8, including a name of the currently activated stimulus type and a graphic representing the currently activated stimulus type. The planned activated stimulus type may be displayed as the graphic Sc in FIG. 8, including a name of the planned activated stimulus type and a graphic representing the planned activated stimulus type.

The presentation control unit 204 may preferably present preview information regarding the next stimulus according to the stimulus plan by the planning unit 207 while the currently activated stimulus is still being provided by the stimulus control unit 209. The next stimulus according to the stimulus plan determined by the planning unit 207 is the one different (i.e., different type stimulus) from the currently activated stimulus. In such manner, the driver may or can change the next stimulus if the next stimulus in the stimulus plan is not the preferred one for the driver. The timing of providing the preview information may be located at or around the end of the currently activated stimulus. For example, the preview information may be provided 10 seconds before the end of the currently activated stimulus or the like. The preview information may be presented by the display on the display unit 24. The preview information may also be presented by sound/voice output from the audio output device 25. The presentation control unit 204 may identify the next stimulus based on the stimulus plan determined by the planning unit 207 and the current position of the own vehicle measured by the locator 6.

Figure 9:
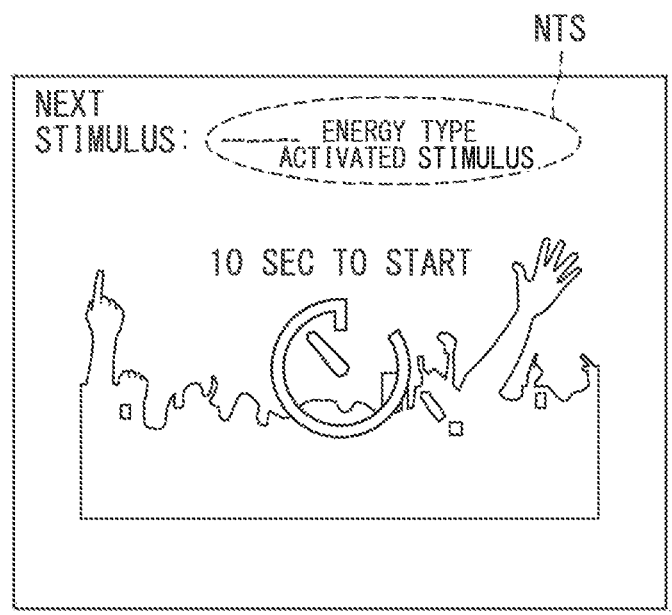
FIG. 9 is a diagram of an example of how to display preview information.
Figure 10:
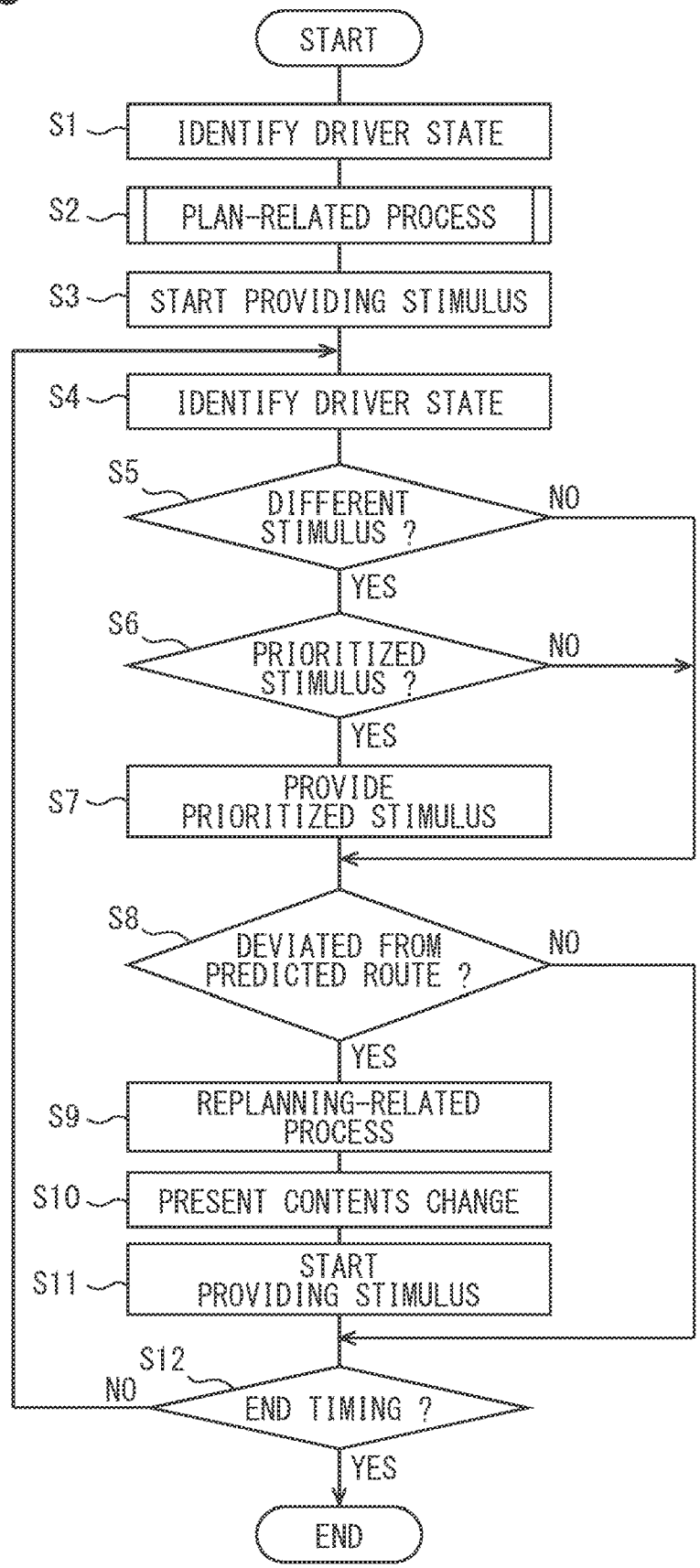
FIG. 10 is a flowchart of a driver state guide-related process in the HCU.
Figure 11:
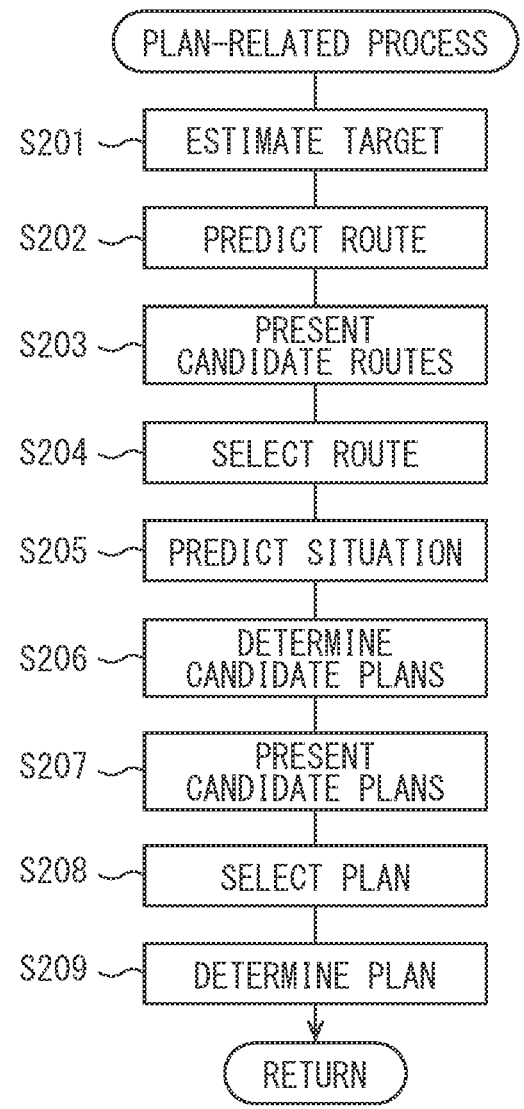
FIG. 11 is a flowchart of a plan-related process in the HCU.

In the following, an example of how to display the preview information is described by using FIG. 9. The preview information may be displayed by using the HUD, or by using the display unit of a navigation device, or by using CID or the like. The preview information may be provided as an image representing the next stimulus, as shown in FIG. 9. The remaining time of the currently activated stimulus before switching to the next stimulus may also be displayed as the preview information, as shown in FIG. 9. The information on the type of the next stimulus may also be displayed as the preview information. A graphic NTS in FIG. 9 is an example of the preview information of the next stimulus, including a name and type of the next stimulus.

<Driver State Guide-Related Process in HCU20>

Subsequently, an example of the flow of the driver state guide-related process in the HCU 20 will be described with reference to a flowchart of FIG. 5. The flowchart of FIG. 5 may be configured such that, for example, when a switch for starting the internal combustion engine or a motor generator of the own vehicle (hereinafter, power switch) is turned on, the power of the HCU 20 also turns on and starts such a process. In addition, in case that an on/off setting of a function for executing the driver state guide-related process can be switched via the user input device 26, a condition that the function for executing the driver state guide-related process is on may also be added to the conditions of starting the process.

First, in step S1, the state identification unit 201 identifies the current driver state of the own vehicle. In step S2, a plan-related process is performed, and the process proceeds to step S3. Here, an example of the flow of the plan-related process will be described with reference to a flowchart of FIG. 6.

In step S201, the target estimation unit 202 estimates a target state of the driver. In step S202, the route prediction unit 203 predicts a route of the own vehicle. In an example of FIG. 5, the route prediction unit 203 is described as predicting a plurality of candidate routes. In step S203, the presentation control unit 204 presents information on a plurality of candidate routes predicted in S202. In step S204, the route selection unit 205 selects one route from the plurality of candidate routes predicted in S202 according to a selection input received from the driver. Note that, in S202, the route prediction unit 203 may be configured to narrow down to one route and make a prediction. In such case, the processes of S203 to S204 may be omitted.

In step S205, the situation prediction unit 206 predicts the en route situation of the predicted route selected in S204. If the route prediction unit 203 is configured to narrow down the prediction to one route in S202, the en route situation of the predicted route predicted in S203 is predicted in step S205. In step S206, the planning unit 207 determines a stimulus plan according to the driver state identified in S1, the target state estimated in S201, and the en route situation of the predicted route predicted in S205. In the example of FIG. 5, it is assumed that a plurality of candidate plans are determined for one predicted route.

In step S207, the presentation control unit 204 presents information of the plurality of candidate plans determined in S206.

In step S208, the plan selection unit 208 selects one candidate plan from the plurality of candidate plans determined in S206 according to a selection input received from the driver.

In step S209, the planning unit 207 determines, as a stimulus plan, a candidate plan selected in S208, and proceeds to step S3.

Note that, in S206, the planning unit 207 may sift one plan from the plurality of candidate plans. In such case, the process of S207 to S208 may be omitted, and, in S209, the stimulus plan determined in S206 may be determined as it is as the stimulus plan.

Returning to FIG. 5, in step S3, the stimulus control unit 209 starts to provide a stimulus for the driver according to the stimulus plan determined in S209. The stimulus will be provided for the driver according to the stimulus plan determined in S209 enroute on the predicted route. For example, in a congested section, a stimulus that is estimated to improve "irritated" state is provided. In a section of monotonous driving, a stimulus that is estimated to improve an absent-minded state and sleepiness is provided. Stimulus is suppressed in high-load sections. For a section in which a state change is not predicted, a stimulus that guides/leads user to an ideal state in that section is provided.

In step S4, the state identification unit 201 identifies the current driver state of the own vehicle.

In step S5, when the stimulus according to the stimulus plan determined in S209 and the stimulus according to the current state identified in S4 are different (YES in S5), the process proceeds to step S6. On the other hand, if there is no difference (NO in S5), the process proceeds to step S8. That is, in other words, the stimulus according to the stimulus plan will be continued.

The stimulus according to the current state may be determined by the stimulus control unit 209 with reference to the correspondence relationship between the driver state and the stimulus associated in advance. For example, for an uncomfortable state, a stimulus for eliminating the uncomfortable state may be determined. For a comfortable state, a stimulus for maintaining the comfortable state may be determined.

In step S6, if the stimulus according to the current state identified in S4 is a stimulus to be prioritized over the stimulus according to the stimulus plan determined in S209 (YES in S6), the process proceeds to step S7. On the other hand, if the stimulus is not a priority stimulus (NO in S6), the process proceeds to step S8. That is, in other words, the stimulus according to the stimulus plan will be continued. The stimulus control unit 209 may determine the priority (i.e., priority order) according to the above-mentioned priority (i.e., priority order).

In step S7, the stimulus control unit 209 causes the stimulus according to the current state identified in S4 to be provided in a prioritized manner than the stimulus according to the stimulus plan determined in S209.

In step S8, when the travel route of the own vehicle deviates from the predicted route used for determining a stimulus plan in S209 (YES in S8), the process proceeds to step S9. On the other hand, if the travel route of the own vehicle does not deviate from the predicted route (NO in S8), the process proceeds to step S12. That is, in other words, the stimulus according to the stimulus plan will be continued. Whether or not the travel route of the own vehicle deviates from the predicted route may be determined by, for example, the route prediction unit 203 using the vehicle position determined by the locator 6.

In step S9, a replanning-related process is performed. The replanning-related process may be the same as the plan-related process described above. In the replanning-related process, the target state estimated in the plan-related process may be reused, or a target state may be newly estimated, e.g., by performing the plan-related process once again.

In step S10, the presentation control unit 204 presents contents of change in the stimulus plan due to the re-planning of the stimulus plan.

In step S11, the stimulus control unit 209 starts stimulating the driver according to the stimulus plan redetermined in the replanning-related process of S9.

In step S12, when it is an end timing of the driver state guide-related process (YES in S12), the driver state guide-related process is ended. On the other hand, if it is not the end timing of the driver state guide-related process (NO in S12), the process returns to S4 and the process is repeated.

As an example of the end timing of the driver state guide-related process, the following may be considered. That is, the power switch of the own vehicle has been turned off, the destination has been reached, or the function for executing the driver state guide-related process has been switched to an off setting.

Summary of the First Embodiment

According to the configuration of the first embodiment, a stimulus plan for stimulating the driver en route is determined, for guiding/leading the driver state to the target state according to the en route situation of the predicted route, in addition to the consideration of the identified current driver state and the target state of the driver. Therefore, the stimulus plan/type is planned and providable more suitably, e.g., on demand, to a change of en route situation during a travel of the vehicle. Further, en route on the predicted route, the driver is stimulated (i.e., stimulus is provided for the driver) according to the decided plan, thereby, as a stimulus for guiding the driver state to a favorable state, a well-suited-to-the-situation (or a well-suited-to-the-situation-change) stimulus is providable.

According to the configuration of the first embodiment, it is possible to activate or suppress the stimulus of the five senses of the driver on a schedule according to the situation without disturbing the driving.

Further, when the situation changes, the stimulus is rescheduled, so that it is possible to further provide a type of stimulus according to the change in the en route situation during a travel of the vehicle.

Second Embodiment

The present disclosure is not limited to a configuration described above in the first embodiment. That is, a configuration in the second embodiment may also be adoptable. In the following, the configuration of the second embodiment is shown as an example with reference to the drawing. The in-vehicle system 1 in the second embodiment has the configuration as the first embodiment, except for the HCU 20, which is replaced with an HCU 20a.

<Configuration of HCU 20a>

Figure 12:
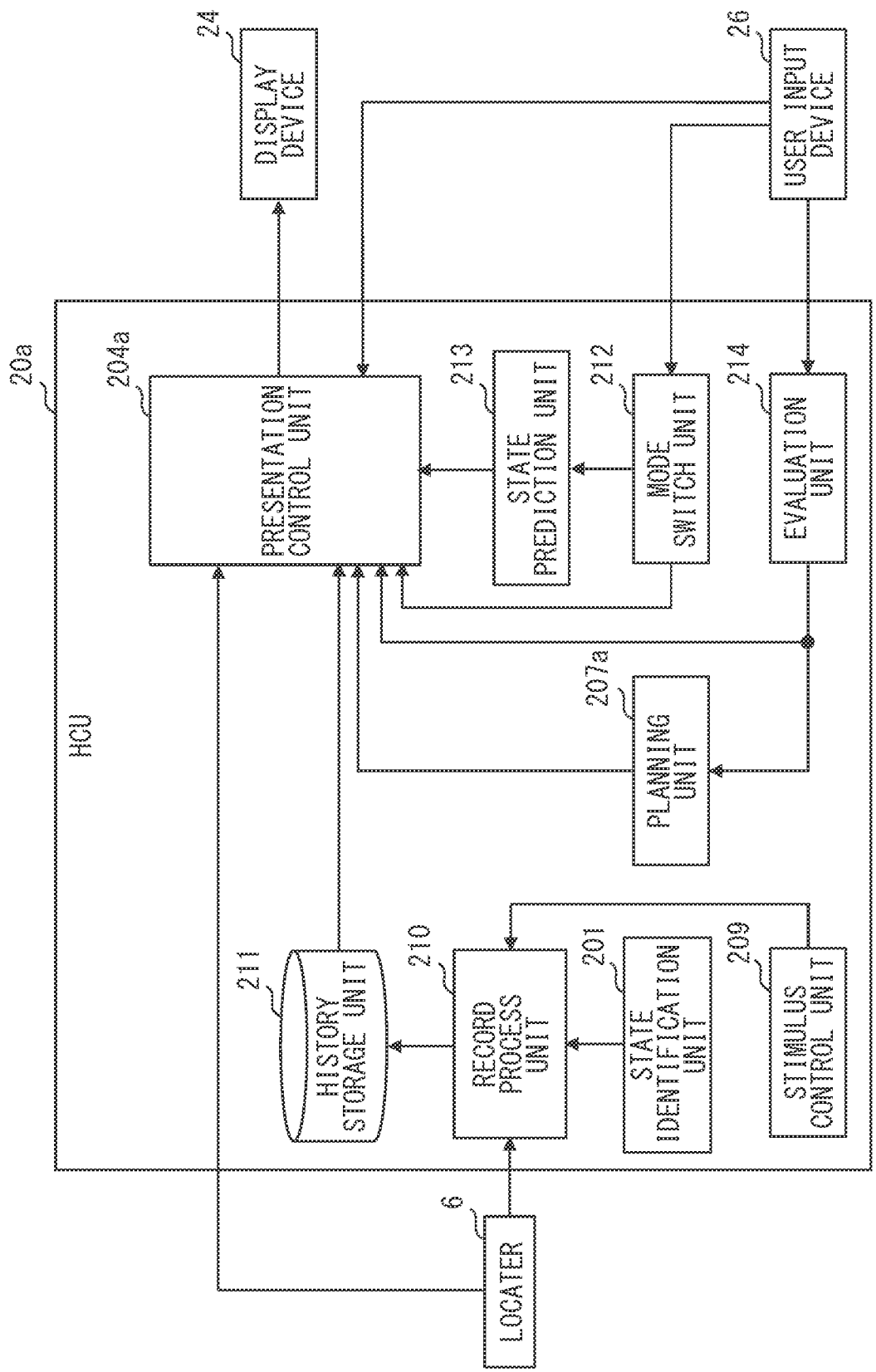
FIG. 12 is a diagram of an example of a schematic configuration of the HCU.

By using FIG. 12, the configuration of the HCU 20a is described. The HCU 20a includes, as functional blocks shown in FIG. 12, the state identification unit 201, a presentation control unit 204a, a planning unit 207a, a stimulus control unit 209, a record process unit 210, a history storage unit 211, a mode switch unit 212, a state prediction unit 213, and an evaluation unit 214. The function block irrelevant to a process that is different from the first embodiment is omitted from the diagram of FIG. 12. That is, the HCU 20a includes, as functional blocks, the target estimation unit 202, the route prediction unit 203, the route selection unit 205, the situation prediction unit 206, and the plan selection unit 208. The HCU 20a is the same as the HUC 20 in the first embodiment, except for having the presentation control unit 204a, the planning unit 207a, and except for having the record process unit 210, the history storage unit 211, the mode switch unit 212, the state prediction unit 213, and the evaluation unit 214. The HCU 20a also corresponds the driver state guide device. Further, the execution of the process of these functional blocks by a computer corresponds to performing the driver state guide method.

The record process unit 210 stores, in the history storage unit 211, positions of past travel of the vehicle (hereinafter, position history), a stimulus provided at such position (hereinafter, stimulus history), and a driver state at such position (hereinafter, driver state history). The stimulus mentioned here means a stimulus provided for the driver from the stimulus control unit 209 according to the stimulus plan determined by the planning unit 207. The record process unit 210 may identify the position of the travel of the own vehicle, based on a current position of the own vehicle measured by the locator 6. Then, the identified position may be stored as the position history. The record process unit 210 may store the stimulus provided by the stimulus control unit 209 at such position as the stimulus history of such position.

The record process unit 210 may store the driver state identified by the state identification unit 201 as the driver state history of such position. Then, the record process unit 210 may associate these histories in the history storage unit 211. The record process unit 210 may store the history as sorted by trips. The trip means a period of travel of the vehicle recorded as a turning ON to turning OFF of a power switch of the vehicle. The history storage unit 211 may be implemented by using a non-volatile memory or the like.

The mode switch unit 212 switches display mode according to an input of the driver from the user input device 26. The input from the driver may be a selection of one of the display modes. The display modes may include, for example, a normal mode, a history mode, a plan comparison mode, a past comparison mode, and a prediction mode. The normal mode is a default display mode. In the normal mode, the plan-related information currently used for travel of the vehicle is displayed as shown in FIG. 7. The history mode is a display mode in which the past history is presented. The plan comparison mode is, as shown in FIGS. 7 and 8, a display mode in which the information on the current driver state and the currently activated stimulus type and the information on the ideal state and the planned activated stimulus (hereinafter, plan comparison display) are displayed. The plan comparison display may be performed in the normal mode, but in this example, it is configured to be performed when selecting the plan comparison mode. The past comparison mode is a display mode in which the information on the current driver state and the currently activated stimulus type and the information on the driver state and the activated stimulus in the past history are displayed. The prediction mode is a display mode in which prediction on a change of the driver state regarding a stimulus provided case and a stimulus not provided case. Note that the display modes switchable by the mode switch unit 212 may be a part of the above-described display modes.

The state prediction unit 213 predicts the change of the driver state regarding (i) a stimulus provided case in which the stimulus is provided according to the stimulus plan that has been determined by the planning unit 207 and (ii) a stimulus not provided case. The state prediction unit 213 may predict the ideal state determined by the planning unit 207 as the change of the driver state in the stimulus provided case in which the stimulus is provided according to the stimulus plan that has been determined by the planning unit 207. The ideal state includes, as described above, a portion of the via state and a portion of the target state. The state prediction unit 213 may predict the change of the driver state in the stimulus not provided case based on the en route situation predicted by the situation prediction unit 206. For example, At a timing at which a monotonous driving is predicted as the en route situation, the change of the driver state to the bored state and the sleepy state may be predicted, for example. In other case, e.g., at a timing at which a traffic congestion is expected as an en route situation, the change of the driver state to the irritated state may be predicted.

The presentation control unit 204a preferably displays history information stored in the history storage unit 211 according to the input from the driver received by the user input device 26, in an overlapping manner, i.e., on top of the map. In such manner, the driver is enabled to confirm and/or evaluate the past history. The presentation control unit 204a displays the history information when the history mode is selected. The user input device 26 corresponds to an input receiving unit.

Figure 13:
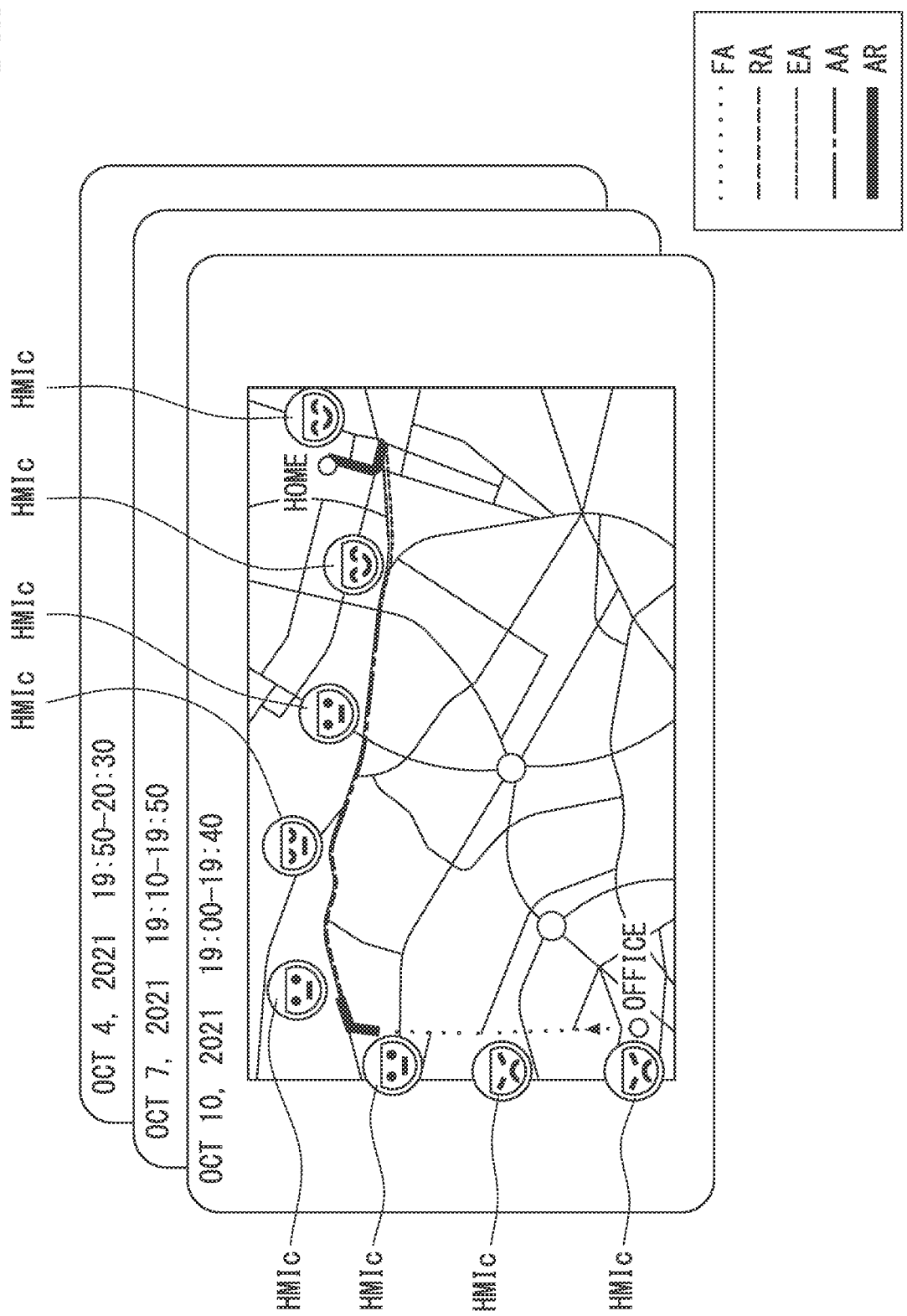
FIG. 13 is a diagram of an example of a display of history information.

Display of the history information is described as an example by using FIG. 13. The history information is displayed on top of the electronic map on the screen of the display device 24. An icon HMIc in FIG. 13 is the information on the driver state history. A group of the positions in the history regarding one trip is a route of the one trip in the past travel. Information on the stimulus history is shown as different line types in FIG. 13. As shown in FIG. 13, the driver state in the past and the stimulus provided in the past are shown in association with each other along a route of one trip. The presentation control unit 204a may simultaneously display the history information for plural trips. For example, as shown in FIG. 13, the history information may be displayed as stacked or layered, trip to trip. The front most history display of the stack may be switched according to an input from the driver, receivable by the user input device 26.

The presentation control unit 204a may preferably display, on the display device 24, the information on the stimulus type and the driver state during a travel of the vehicle at a certain position of the predicted route, in addition to displaying the information on the driver state identified by the state identification unit 201 at such position and the type of the stimulus provided at such timing, i.e., the currently activated stimulus type at the timing of identifying such a driver state, based on the history stored in the history storage unit 211. In such manner, the driver can readily recognize the driver state and the activated stimulus type regarding the same position in the current trip and the past trip. That is, the difference therebetween (i.e., among the driver states/stimulus types in the current trip and the past trip(s)) is readily understood. In the following, the stimulus type provided in the past at the same position is designated as a past activated stimulus type. Further, the driver state in the past at the same position is designated as a past driver state. The presentation control unit 204a displays, when the past comparison mode is selected, the past driver state and the past activated stimulus type in addition to the current driver state and the currently activated stimulus type. The presentation control unit 204a may display, in a comparison enabled manner, (a) the information on the current driver state and the currently activated stimulus type and (b) the information on the past driver state and the past activated stimulus type.

The presentation control unit 204a preferably sifts the same positions in the past as to the ones in the trips having the same trip start point from among the history of the trips stored in the history storage unit 211. In such manner, the difference of the driver state/activated stimulus between the current trip and the past trip regarding the similar routes can be readily recognized by the driver. Thus, the driver can easily compare the similar situations in the current trip and the past trip for finding the difference regarding the driver state and the activated stimulus type. Further, the presentation control unit 204a may further sift the history stored in the history storage unit 211, for finding the trips having the same route from the start point to the end point. In such manner, the difference of the driver state/activated stimulus between the current trip and the past trip regarding the same routes can be readily recognized by the driver. Thus, the driver can easily compare the very similar situations in the current trip and the past trip for finding the difference regarding the driver state and the activated stimulus type.

Figure 14:
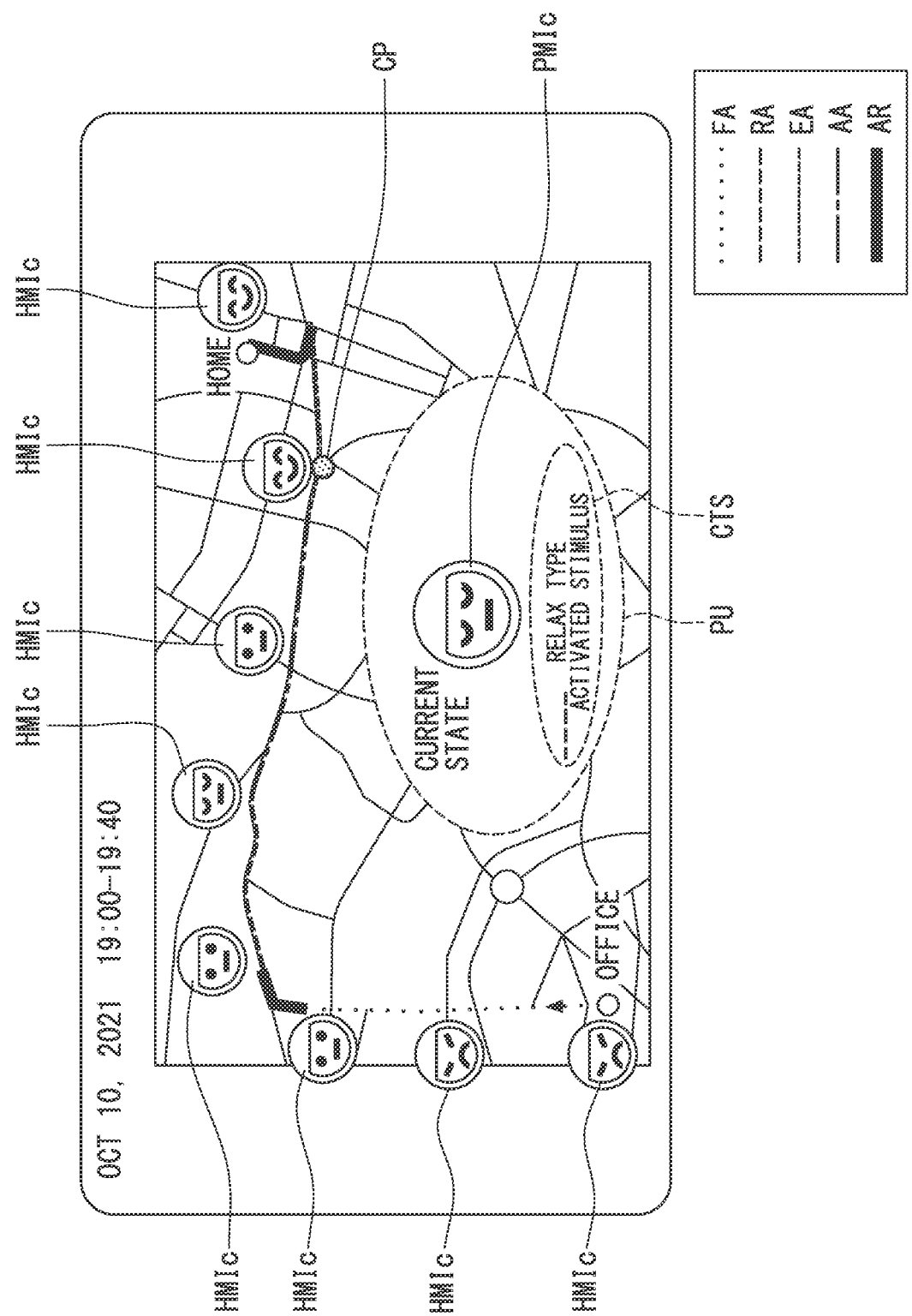
FIG. 14 is a diagram of an example of how to display information on a current state of a driver and a currently activated stimulus type and information on a past state of a driver and a past activated stimulus.

By using FIGS. 14 and 15 as examples, how to display (a) the information on the current driver state and the currently activated stimulus type and (b) the information on the past driver state and the past activated stimulus type is described. First, in FIG. 14, an overlap display of the information in the past history and the current situation on the electronic map is shown. A point CP in FIG. 14 represents a current position of the own vehicle. A graphic PU in FIG. 14 represents the information on the current driver state and the currently activated stimulus type. An icon PMIc represents the information on the current driver state. A graphic CTS represents the information on the currently activated stimulus type. The information on the current driver state and the currently activated stimulus type may be displayed as a pop-up graphic that is associated with the current position of the own vehicle as shown in FIG. 14. The current driver state may be displayed as the icon PMIc in FIG. 14. The currently activated stimulus type may be displayed as the graphic CTS in FIG. 14, including a name of the currently activated stimulus type and a graphic representing the currently activated stimulus type. The past driver state may be displayed on top of the electronic map along the route which is represented by the group of the positions in the history, as shown in FIG. 14 by the icons HMIc. The past activated stimulus types may be represented by using the different type of the lines overlappingly shown along the route which is made up of the group of the positions in the history. The different type of the lines may be classified in the same manner as FIG. 5.

Next, the display of (a) the information on the current driver state and the currently activated stimulus type and (b) the information on the past driver state and the past activated stimulus type without the electronic map, i.e., in a non-overlap manner, is described, with reference to FIG. 15. The display of (a) the information on the current driver state and the currently activated stimulus type and (b) the information on the past driver state and the past activated stimulus type may be, for example, projected in a front space of the driver by using the HUD, i.e., on a windshield. A graphic Pr represents an example of (a) the information on the current driver state and the currently activated stimulus type. A graphic Hi represents an example of (b) the information on the past driver state and the past activated stimulus type. The current and the past driver states may both be represented by the icons, as shown in FIG. 15. The currently activated stimulus type may be, as represented by an example of the graphic Pr in FIG. 15, shown by using a name and the graphic of the currently activated stimulus type. The past activated stimulus type may be, as represented by an example of the graphic Hi in FIG. 15, shown by using a name and the graphic of the past activated stimulus type.

The presentation control unit 204a preferably displays, on the display device 24, the prediction results predicted by the state prediction unit 213. In such manner, the driver can predictively recognize the change of the driver state, regarding both of (i) the stimulus provided case, in which the stimulus according to the stimulus plan in provided and (ii) the stimulus not provided case. The presentation control unit 204a displays the prediction results from the state prediction unit 213 when the prediction mode is selected.

Now, by using FIG. 16, how to display the prediction results of the state prediction unit 213 is described. The presentation control unit 204a may present the transition of the driver state, starting from the current driver state, as to the stimulus provided case and the stimulus not provided case, separately. More practically, as shown in FIG. 16, the driver state may be represented by using icons representing facial expressions. Further, the facial expression icons may be arranged in a chronological order according to the prediction of the transition of the driver state, respectively for the stimulus provided case and the stimulus not provided case.

The evaluation unit 214 evaluates, according to an input from the driver received by the user input device 26, at least one of (i) the stimulus currently being provided for the driver, (ii) the stimulus planned to be provided for the driver, and (iii) the past stimulus provided in the past for the driver. The input regarding the evaluation may be, for example, an input for selecting a stimulus to be evaluated (hereinafter, a stimulus selection input) and an input for evaluating the selected stimulus (hereinafter, a stimulus evaluation input). The user input device 26 used for receiving the stimulus selection input may be a touch panel. The stimulus selection input may then be provided as a touch operation on a screen of the display device 24, indicating one of the activated stimulus types displayed thereon as information (e.g., as buttons). That is, for example, a touch operation on the displayed information, i.e., on one of the activated stimulus types shown in FIGS. 7, 8, 14, and 15, can be picked up as a selection input of the stimulus currently being provided for the driver. Or, a touch operation on the displayed information, i.e., on one of the activated stimulus types shown in FIG. 5 can be picked up as a selection input of the stimulus planned to be provided for the driver. Further, a touch operation on the displayed information, i.e., on one of the activated stimulus types shown in FIG. 7 in a not-yet traveled section of the route can be picked up as a selection input of the stimulus planned to be provided for the driver. Further, a touch operation on the displayed information, i.e., on the next stimulus shown in FIG. 9 can also be picked up as a selection input of the stimulus planned to be provided for the driver. Or, a touch operation on the displayed information, i.e., on one of the past activated stimulus types shown in FIGS. 13, 14, can be picked up as a selection input of the stimulus provided in the past for the driver. Further, a touch operation on the displayed information, i.e., on one of the activated stimulus types shown in FIG. 7 in an already-traveled section of the route can be picked up as a selection input of the stimulus provided in the past for the driver.

The stimulus evaluation input may be received as a rating input shown in FIG. 17, for example. In such case, the evaluation unit 214 may evaluate the stimulus having a high rating number as a highly-evaluated stimulus. The evaluation unit 214 may evaluate a stimulus with reference to the same en route situation where such a stimulus is determined to be provided in a stimulus plan. Further, the stimulus evaluation input may be used to change the stimulus by allowing the driver/user to pick up a preferred one from among the selection options as shown in FIG. 18. In such case, the evaluation unit 214 may raise the evaluation of the selected (i.e., preferred) stimulus, and may lower the evaluation of the stimulus replaced with the preferred one.

The planning unit 207a may preferably make the highly-evaluated stimulus by the evaluation unit 214 easily picked up and taken in the stimulus plan, and may preferably make the lowly-evaluated stimulus by the evaluation unit 214 to be hardly taken in the stimulus plan. In such manner, the stimulus selection may be adapted/improved to reflect the driver's preference.

Third Embodiment

The stimulus that guides/leads the driver state is not limited to the stimulus described in the first embodiment. For example, the stimulus of other types such as vibration by a vibrator and the like may be configured to guide/lead the driver state.

Fourth Embodiment

In the above-described embodiments, the HCU 20 is configured to perform the driver state guide-related process. However, the present disclosure is not necessarily limited to such a configuration. For example, the driver state guide-related process may be performed by the HCU 20 and other ECU(s), or may be performed by other ECU(s).

It should be noted that the present disclosure is not limited to the embodiments described above, and various modifications are possible within the scope indicated in the claims, and embodiments obtained by appropriately combining technical means disclosed in different embodiments are also included in the technical scope of the present disclosure.

In addition, the control unit and the method described in the present disclosure may be implemented by a dedicated computer that configures a processor programmed to execute one or a plurality of functions embodied by a computer program.

Alternatively, the apparatus/device and method described in the present disclosure may be implemented by dedicated hardware logic circuit.

Alternatively, the device and the method described in the present disclosure may be implemented by one or more special purpose computers configured by a combination of a processor executing a computer program and one or more hardware logic circuits.

Further, the computer program may be stored, as a program product, in a computer-readable, non-transitory, tangible storage medium as instructions to be executed by a computer.

Technical Thought Disclosed in the Present Disclosure

The present disclosure discloses plural technical thoughts recited in a numbered form in series as follows. A part of the plural technical thoughts depends selectively from preceding thoughts in a multiple dependent form. Further, a part of the plural technical thoughts depends from preceding thoughts in a multiple dependent form referring to another multiple dependent form. These multiple dependent forms define plural technical thoughts.

Technical Thought 1

A driver state guide device usable in a vehicle comprises:
a state identification unit identifying a state of a driver of the vehicle;
a target estimation unit presuming a target state to which the state of the driver is guided;
a route prediction unit providing a predicted route of the vehicle;
a situation prediction unit predicting a situation en route on the predicted route predicted by the route prediction unit;
a planning unit planning, as a stimulus plan, a stimulus to be used en route on the predicted route to guide the state of the driver to the target state, according to (i) the state identified by the state identification unit, (ii) the target state estimated by the target estimation unit, and (iii) the situation on the predicted route predicted by the situation prediction unit; and
a stimulus control unit providing the stimulus to stimulus for the driver according to the stimulus plan determined by the planning unit en route on the predicted route.

Technical Thought 2

The driver state guide device in the Technical thought 1, may further include the following. That is, the situation prediction unit predicts a high-load situation in which the driver's driving load is high, and
    the planning unit determines the stimulus plan to suppress the stimulus for a section of the predicted route regarding which the situation prediction unit predicts the high-load situation.

Technical Thought 3

The driver state guide device in the Technical thought 1 or 2, may further include the following. That is, the planning unit determines the stimulus plan in which a stimulus scheduled to have a short duration less than a threshold value is replaced with a stimulus before or after the short duration stimulus.

Technical Thought 4

The driver state guide device in any one of the Technical thoughts 1 to 3, may further include the following. That is, the situation prediction unit predicts a deterioration situation in which the driver state deteriorates, and
    the planning unit determines, for a section of the predicted route regarding which the situation prediction unit predicts the deterioration situation, the stimulus plan (i) to provide an improving stimulus that improves the deterioration situation and (ii) to start providing the improving stimulus before entering into such a section of the predicted route.

Technical Thought 5

The driver state guide device in any one of the Technical thoughts 1 to 4, may further include the following. That is, the situation prediction unit predicts at least one of the high-load situation, a degree of congestion, and a monotonous driving.

Technical Thought 6

The driver state guide device in any one of the Technical thoughts 1 to 5, may further include the following. That is, a presentation control unit presenting plan-related information regarding the stimulus plan determined by the planning unit for providing a stimulus for the driver.

Technical Thought 7

The driver state guide device in the Technical thought 6, may further include the following. That is, the presentation control unit presents the plan-related information at least as a display on a display device, the display of the plan-related information overlappingly displayed on a map at least partially including (a) the predicted route, (b) the stimulus type provided for the driver en route along the predicted route according to the stimulus plan determined by the planning unit, and (c) an ideal state of the driver toward which the driver is guided by the provided stimulus.

Technical Thought 8

The driver state guide device in the Technical thought 6 or 7, may further include the following. That is, the presentation control unit presents the plan-related information at least as a display on a display device, the display of the plan-related information including (A) information on (a) the state of the driver identified by the state identification unit and (b) the stimulus type provided for the driver at a timing of identifying the state of the driver during the travel of the vehicle along the predicted route in addition to (B) information on (c) the stimulus planned by the planning unit to be provided for the driver at the timing of identifying the state of the driver according to the stimulus plan determined by the planning unit and (d) the ideal state of the driver to be guided/induced by the planned stimulus.

Technical Thought 9

The driver state guide device in any one of the Technical thoughts 6 to 8, may further include the following. That is, the driver state guide device further includes a history storage unit storing history of (i) positions of a past travel of the vehicle, (ii) the stimulus provided at each of the positions of the past travel, and (iii) the state of the driver at each of the positions of the past travel, and
    the presentation control unit presents information at least as a display on a display device, the display of the information overlappingly displayed on a map being information on the history stored in the history storage unit and selected according an input received by an input receiving unit that receives an input of the driver.

Technical Thought 10

The driver state guide device in any one of the Technical thoughts 6 to 9, may further include the following. That is, the driver state guide device further includes a history storage unit storing history of (i) positions of a past travel of the vehicle, (ii) the stimulus provided at each of the positions of the past travel, and (iii) the state of the driver at each of the positions of the past travel, and
    the presentation control unit presents information at least as a display on a display device, the display of the information being (A) the information on (a) the state of the driver identified by the state identification unit and (b) the stimulus type provided for the driver at a timing of identifying the state of the driver during the travel of the vehicle along the predicted route in addition to (B) the information on the stimulus type and the state of the driver at each of same positions in the past based on the history stored in the history storage unit.

Technical Thought 11

The driver state guide device in any one of the Technical thoughts 6 to 10, may further include the following. That is, the presentation control unit presents preview information while still providing the stimulus for the driver from the stimulus control unit, the preview information presented as a preview of a next stimulus next to a current one according to the stimulus plan determined by the planning unit.

Technical Thought 12

The driver state guide device in any one of the Technical thoughts 6 to 11, may further include the following. That is, the driver state guide device further includes an evaluation unit evaluating, according to an input from the driver received by the input receiving unit, at least one of (i) the stimulus currently being provided for the driver, (ii) the stimulus planned to be provided for the driver, and (iii) past stimulus provided in the past for the driver, and higher an evaluation of a stimulus by the evaluation unit, easier such a stimulus is made to be picked up and taken in the stimulus plan by planning unit, and lower the evaluation of a stimulus by the evaluation unit, harder such a stimulus is made to be picked up and taken in the stimulus plan.

Technical Thought 13

The driver state guide device in any one of the Technical thoughts 6 to 12, may further include the following. That is, the driver state guide device further includes a state prediction unit predicting change of the state of the driver regarding (i) a stimulus provided case in which the stimulus is provided according to the stimulus plan determined by the planning unit and (ii) a stimulus not provided case, and the presentation control unit presents information at least as a display on a display device, the display of the information being a prediction result of the state prediction unit.

Technical Thought 14

The driver state guide device in any one of the Technical thoughts 6 to 13, may further include the following. That is, the route prediction unit re-predicts the route of the vehicle when the route actually traveled by the vehicle deviates from the predicted route, the situation prediction unit predicts the situation en route on the re-predicted route when the re-predicted route of the vehicle is provided by the route prediction unit, the planning unit re-determines the stimulus plan for stimulating the driver when the re-predicted route of the vehicle is provided by the route prediction unit, and the presentation control unit presents, at least as the plan-related information, contents of change of the stimulus plan due to the re-determination of the stimulus plan when the stimulus plan for stimulating the driver is re-determined by the planning unit.

Technical Thought 15

The driver state guide device in any one of the Technical thoughts 6 to 14, may further include the following. That is, the route prediction unit predicts a plurality of candidate routes as the route of the vehicle, the presentation control unit presents, at least as the plan-related information, information of the candidate routes predicted by the route prediction unit, a route selection unit selecting one of the plurality of candidate route predicted by the route prediction unit according to a selection input received from the driver is provided, and the situation prediction unit predicts the situation en route on the predicted route that is selected by the route selection unit as one of the plurality of the candidate routes predicted by the route prediction unit.

Technical Thought 16

The driver state guide device in any one of the Technical thoughts 6 to 15, may further include the following. That is, the planning unit determines a plurality of candidate plans for one predicted route as the stimulus plan for stimulating the driver, the presentation control unit presents, at least as the plan-related information, information of the candidate plans determined by the planning unit, a plan selection unit selecting one of the plurality of candidate plans determined by the planning unit according to a selection input received from the driver is further included in the driver state guide device, and the stimulus control unit provides, en route on the predicted route, the stimulus for the driver according to the stimulus plan selected by the plan selection unit from the plurality of candidate plans determined by the planning unit.

Technical Thought 17

The driver state guide device in any one of the Technical thoughts 1 to 16, may further include the following. That is, the situation prediction unit predicts a change situation in which the driver state changes from a pre-change driver state to a post-change driver state, and the planning unit re-determines the stimulus plan to use the stimulus according to the post-change driver state that is actually identified by the state identification unit for a section of the predicted route regarding which the situation prediction unit has predicted the change situation, in case that the post-change driver state.

Technical Thought 18

The driver state guide device in any one of the Technical thoughts 1 to 17, may further include the following. That is, the state identification unit identifies, as the driver state, a state including a specific state which is at least one of the sleepy state, the absent-minded state, and a stressed state, and the stimulus control unit causes the driver to be stimulated by a stimulus that is estimated to improve the specific state regardless of the stimulus plan determined by the planning unit, based on the specific state identified by the state identification unit, enroute on/along the predicted route.

Technical Thought 19

The driver state guide device in the Technical thought 18, may further include the following. That is, when the stimulus control unit causes a stimulus estimated to improve the specific state, and, after the state identified by the state identification unit has improved from the specific state by such stimulus, the stimulus control unit provides, enroute on the predicted route, "non-guiding" stimulus in a prioritized manner, which is a stimulus estimated not to guide the driver state back to the specific state, regardless of the stimulus plan determined by the planning unit, based on a fact that (i) the non-guiding stimulus and (ii) the stimulus according to the stimulus plan determined by the planning unit do not match.

Technical Thought 20

The driver state guide device in the Technical thought 18, may further include the following. That is, the state identification unit identifies, as the driver state, a state chosen from among (i) the specific state which is at least one of the sleepy state, the absent-minded state, and a stressed state, and (ii) other states other than the specific state, including an uncomfortable state and a comfortable state, and in a situation that a stimulus that does not match the one in the stimulus plan determined by the planning unit enroute is requested enroute on the predicted route, the stimulus control unit provides, according to a predetermined priority order, a stimulus having a higher priority chosen from among (i) the stimulus according to the stimulus plan determined by the planning unit and (ii) the stimulus that does not match such a stimulus, the predetermined priority order of the stimuli is, in an order from high priority to low priority, a stimulus corresponding to sleepiness, a stimulus corresponding to the absent-minded state, a stimulus corresponding to the stressed state, a stimulus corresponding to the uncomfortable state, and a stimulus corresponding to the comfortable state.

Technical Thought 21

A method of guiding a state of a driver usable in a vehicle, performable by at least one processor, the method comprising:
- a state identifying step identifying the state of the driver of the vehicle;
- a target state presuming step presuming a target state, which is a state to which the state of the driver is guided;
- a route predicting step providing a predicted route of the vehicle;
- a situation predicting step predicting a situation involving the driver and the vehicle enroute on the predicted route given by the route predicting step;
- a planning step planning, as a stimulus plan, a stimulus to be used enroute on the predicted route to guide the state of the driver to the target state, according to (i) the driver state identified by the state identifying step, (ii) the target state estimated by the target presuming step and (iii) the situation on the predicted route predicted by the situation predicting step; and
- a stimulus controlling step providing a stimulus for the driver according to the stimulus plan determined by the planning step during a travel of the vehicle enroute on the predicted route.

What is claimed is:

1. A driver state guide device usable in a vehicle comprising:
   - a state identification unit identifying a present state of a driver of the vehicle;
   - a target estimation unit estimating a target state of the driver;
   - a route prediction unit providing a predicted route of the vehicle;
   - a situation prediction unit predicting a situation in the predicted route;
   - a planning unit planning a stimulus plan, including a stimulus for the driver, to be used in the predicted route to guide the driver from the present state to the target state, according to:
     (i) the present state identified by the state identification unit,
     (ii) the target state estimated by the target estimation unit, and
     (iii) the situation predicted by the situation prediction unit; and
   - a stimulus control unit providing the stimulus according to the stimulus plan.

2. The driver state guide device of claim 1, wherein
the situation prediction unit predicts a high-load situation in which the driver's driving load is high, and
the planning unit plans the stimulus plan to suppress the stimulus for a section of the predicted route associated with the high-load situation.

3. The driver state guide device of claim 1, wherein
the planning unit plans the stimulus plan in which a first stimulus scheduled to have a short duration less than a threshold value is:
(i) replaced with a second stimulus scheduled before the short duration stimulus, or
(ii) replaced with a third stimulus scheduled after the short duration stimulus.

4. The driver state guide device of claim 1, wherein
the situation prediction unit predicts a deterioration situation in which the driver state deteriorates, and
the planning unit plans, for a section of the predicted route associated with the deterioration situation, the stimulus plan:
(i) to provide an improving stimulus that improves the deterioration situation, and
(ii) to start providing the improving stimulus before entering into the section of the predicted route associated with the deterioration situation.

5. The driver state guide device of claim 1, wherein
the situation prediction unit predicts at least one of:
(i) a high-load situation,
(ii) a degree of congestion, and
(iii) a monotonous driving.

6. The driver state guide device of claim 1 further comprising:
a presentation control unit presenting plan-related information regarding the stimulus plan.

7. The driver state guide device of claim 6, wherein
the presentation control unit presents the plan-related information at least as a display on a display device, the display of the plan-related information overlappingly displayed on a map at least partially including:
(a) the predicted route,
(b) the stimulus type provided for the driver in route along the predicted route according to the stimulus plan determined by the planning unit, and
(c) an ideal state of the driver toward which the driver is guided by the provided stimulus.

8. The driver state guide device of claim 6, wherein
(i) the presentation control unit presents the plan-related information at least as a display on a display device,
(ii) the display of the plan-related information includes:
(a) the present state of the driver identified by the state identification unit,
(b) the stimulus type provided for the driver at a timing of identifying the state of the driver during the travel of the vehicle along the predicted route,
(c) the stimulus planned by the planning unit to be provided for the driver at the timing of identifying the state of the driver according to the stimulus plan determined by the planning unit, and
(d) an ideal state of the driver to be guided/induced by the planned stimulus.

9. The driver state guide device of claim 6 further comprising:
a history storage unit storing history of:
(i) positions of a past travel of the vehicle,
(ii) stimuluses provided at each of the positions of the past travel, and
(iii) the state of the driver at each of the positions of the past travel, wherein
the presentation control unit presents information at least as a display on a display device, the display of the information overlappingly displayed on a map being information on the history stored in the history storage unit and selected according an input received by an input receiving unit that receives an input of the driver.

10. The driver state guide device of claim 6 further comprising:
a history storage unit storing history of:
(i) positions of a past travel of the vehicle,
(ii) stimuluses provided at each of the positions of the past travel, and
(iii) the state of the driver at each of the positions of the past travel, wherein
the presentation control unit presents information at least as a display on a display device, the display of the information includes:
(a) the state of the driver identified by the state identification unit,
(b) the stimulus type provided for the driver at a timing of identifying the state of the driver during the travel of the vehicle along the predicted route,
(c) the stimulus type, and
(d) the state of the driver at each of same positions in the past based on the history stored in the history storage unit.

11. The driver state guide device of claim 6, wherein
the presentation control unit presents preview information while still providing the stimulus for the driver from the stimulus control unit, wherein the preview information is presented as a preview of a next stimulus next to a current one according to the stimulus plan determined by the planning unit.

12. The driver state guide device of claim 6 further comprising:
an evaluation unit evaluating, according to an input from the driver received by the input receiving unit, at least one of:
(i) the stimulus currently being provided for the driver,
(ii) the stimulus planned to be provided for the driver, and
(iii) past stimulus provided in the past for the driver, wherein
higher an evaluation of a stimulus by the evaluation unit, easier such a stimulus is made to be picked up and taken in the stimulus plan by planning unit, and
lower the evaluation of a stimulus by the evaluation unit, harder such a stimulus is made to be picked up and taken in the stimulus plan.

13. The driver state guide device of claim 6 further comprising:
a state prediction unit predicting change of the state of the driver regarding:
(i) a stimulus-provided case in which the stimulus is provided according to the stimulus plan determined by the planning unit and
(ii) a stimulus-not-provided case, wherein
the presentation control unit presents information at least as a display on a display device, the display of the information being a prediction result of the state prediction unit.

14. The driver state guide device of claim 6, wherein
the route prediction unit re-predicts the route of the vehicle when the route actually traveled by the vehicle deviates from the predicted route,
the situation prediction unit predicts the situation in the re-predicted route when the re-predicted route of the vehicle is provided by the route prediction unit,
the planning unit re-plans the stimulus plan for stimulating the driver when the re-predicted route of the vehicle is provided by the route prediction unit, and
the presentation control unit presents, at least as the plan-related information, contents of change of the stimulus plan due to the re-planning of the stimulus plan.

15. The driver state guide device of claim 6, further comprising:
a route selection unit, wherein
the route prediction unit predicts candidate routes as the routes of the vehicle,
the presentation control unit presents, at least as the plan-related information, information of the candidate routes,
the route selection unit selects one of the candidate routes predicted by the route prediction unit according to a selection input received from the driver, and
the situation prediction unit predicts the situation in the selected route.

16. The driver state guide device of claim 6, further comprising:
a plan selection unit, wherein
the planning unit determines candidate stimulus plans for one predicted route for stimulating the driver,
the presentation control unit presents, at least as the plan-related information, information of the candidate stimulus plans,
the plan selection unit selects one of candidate stimulus plans according to a selection input received from the driver is provided, and
the stimulus control unit provides, in the predicted route, the stimulus for the driver according to the selected candidate stimulus plan.

17. The driver state guide device of claim 1, wherein
the situation prediction unit predicts a change situation in which the driver state changes from a pre-change driver state to a post-change driver state, and
the planning unit re-plans the stimulus plan to use the stimulus according to the post-change driver state that is actually identified by the state identification unit for a section of the predicted route.

18. The driver state guide device of claim 1, wherein
the state identification unit identifies, as the driver state, a state including a specific state which is at least one of:
(i) a sleepy state, (ii) an absent-minded state, and (iii) a stressed state, and
the stimulus control unit causes the driver to be stimulated by a stimulus that is estimated to improve the specific state regardless of the stimulus plan planned by the planning unit.

19. The driver state guide device of claim 18,
wherein when the stimulus control unit causes a stimulus estimated to improve the specific state, and, after the state identified by the state identification unit has improved from the specific state by such stimulus, the stimulus control unit provides, in the predicted route, a non-guiding stimulus in a prioritized manner, wherein the non-guiding stimulus is estimated not to guide the driver state back to the specific state, regardless of the stimulus plan determined by the planning unit, because the non-guiding stimulus does not match a previously planned stimulus according to a previous stimulus plan.

20. The driver state guide device of claim 18, wherein the state identification unit identifies, as the driver state, a state chosen from among:
    (i) the specific state which is at least one of the sleepy state, the absent-minded state, and a stressed state, and
    (ii) other states other than the specific state, including an uncomfortable state and a comfortable state, and in a situation that a stimulus that does not match the one in the stimulus plan determined by the planning unit in the predicted route, the stimulus control unit provides, according to a predetermined priority order, a stimulus having a higher priority chosen from among (i) the stimulus according to the stimulus plan and (ii) the stimulus not according to the stimulus plan, the predetermined priority order of the stimuli is, in an order from high priority to low priority:
    (a) a stimulus corresponding to sleepiness,
    (b) a stimulus corresponding to the absent-minded state,
    (c) a stimulus corresponding to the stressed state,
    (d) a stimulus corresponding to the uncomfortable state, and
    (e) a stimulus corresponding to the comfortable state.

21. A method of guiding a state of a driver usable in a vehicle, performable by at least one processor, the method comprising:
    a state identifying step identifying a present state of the driver of the vehicle;
    a target state estimating step estimating a target state, which is a state to which the present state of the driver is guided;
    a route predicting step providing a predicted route of the vehicle;
    a situation predicting step predicting a situation in the predicted route;
    a planning step planning, as a stimulus plan, a stimulus to be used in the predicted route to guide the present state of the driver to the target state, according to:
        (i) the driver state identified by the state identifying step,
        (ii) the target state estimated by the target presuming step and
        (iii) the situation on the predicted route predicted by the situation predicting step; and
    a stimulus controlling step providing a stimulus for the driver according to the stimulus plan planned by the planning step.

* * * * *